United States Patent
Abts

(10) Patent No.: US 12,001,383 B2
(45) Date of Patent: Jun. 4, 2024

(54) DETERMINISTIC MEMORY FOR TENSOR STREAMING PROCESSORS

(71) Applicant: Groq, Inc., Mountain View, CA (US)

(72) Inventor: Dennis Charles Abts, Eau Claire, WI (US)

(73) Assignee: Groq, Inc., Mountain View, CA (US)

(*) Notice: Subject to any disclaimer, the term of this patent is extended or adjusted under 35 U.S.C. 154(b) by 14 days.

(21) Appl. No.: 17/858,493

(22) Filed: Jul. 6, 2022

(65) Prior Publication Data

US 2023/0024670 A1 Jan. 26, 2023

Related U.S. Application Data

(60) Provisional application No. 63/219,145, filed on Jul. 7, 2021.

(51) Int. Cl.
*G06F 15/80* (2006.01)
*G06F 12/02* (2006.01)
(Continued)

(52) U.S. Cl.
CPC ............ *G06F 15/80* (2013.01); *G06F 12/023* (2013.01); *G06F 12/0813* (2013.01);
(Continued)

(58) Field of Classification Search
CPC .... G06F 15/80; G06F 12/023; G06F 12/0813; G06F 2212/251; G06F 2212/454; G06F 12/0207; G06F 12/0284; G06N 20/00
See application file for complete search history.

(56) References Cited

U.S. PATENT DOCUMENTS 11,243,880 B1 * 2/2022 Ross ............... G06F 12/0284
11,360,934 B1 * 6/2022 Abts ................ G06F 9/3001
(Continued)

OTHER PUBLICATIONS

Abts et al.; Think Fast: A Tensor Streaming Processor (TSP) for Accelerating Deep Learning Workloads; IEEE; Jun. 10, 2020 (Year: 2020).*
(Continued)

*Primary Examiner* — Corey S Faherty
(74) *Attorney, Agent, or Firm* — Amin, Turocy & Watson, LLP

(57) ABSTRACT

Embodiments are directed to a deterministic streaming system with one or more deterministic streaming processors each having an array of processing elements and a first deterministic memory coupled to the processing elements. The deterministic streaming system further includes a second deterministic memory with multiple data banks having a global memory address space, and a controller. The controller initiates retrieval of first data from the data banks of the second deterministic memory as a first plurality of streams, each stream of the first plurality of streams streaming toward a respective group of processing elements of the array of processing elements. The controller further initiates writing of second data to the data banks of the second deterministic memory as a second plurality of streams, each stream of the second plurality of streams streaming from the respective group of processing elements toward a respective data bank of the second deterministic memory.

20 Claims, 21 Drawing Sheets

(51) Int. Cl.
    *G06F 12/0813*   (2016.01)
    *G06N 20/00*     (2019.01)
(52) U.S. Cl.
    CPC .. *G06F 2212/251* (2013.01); *G06F 2212/454* (2013.01); *G06N 20/00* (2019.01)

(56) References Cited

U.S. PATENT DOCUMENTS

| | | | |
|---|---|---|---|
| 2020/0125995 A1* | 4/2020 | Wang | G06N 20/00 |
| 2020/0234396 A1* | 7/2020 | Qi | G06F 12/0207 |
| 2021/0081806 A1* | 3/2021 | Chai | G06N 3/045 |
| 2023/0024670 A1* | 1/2023 | Abts | G06F 15/80 |

OTHER PUBLICATIONS

Abts, D. et al. "A Software-defined Tensor Streaming Multiprocessor for Large-scale Machine Learning," *49th Annual International Symposium on Computer Architecture*, Jun. 18-22, 2022, pp. 567-580.

* cited by examiner

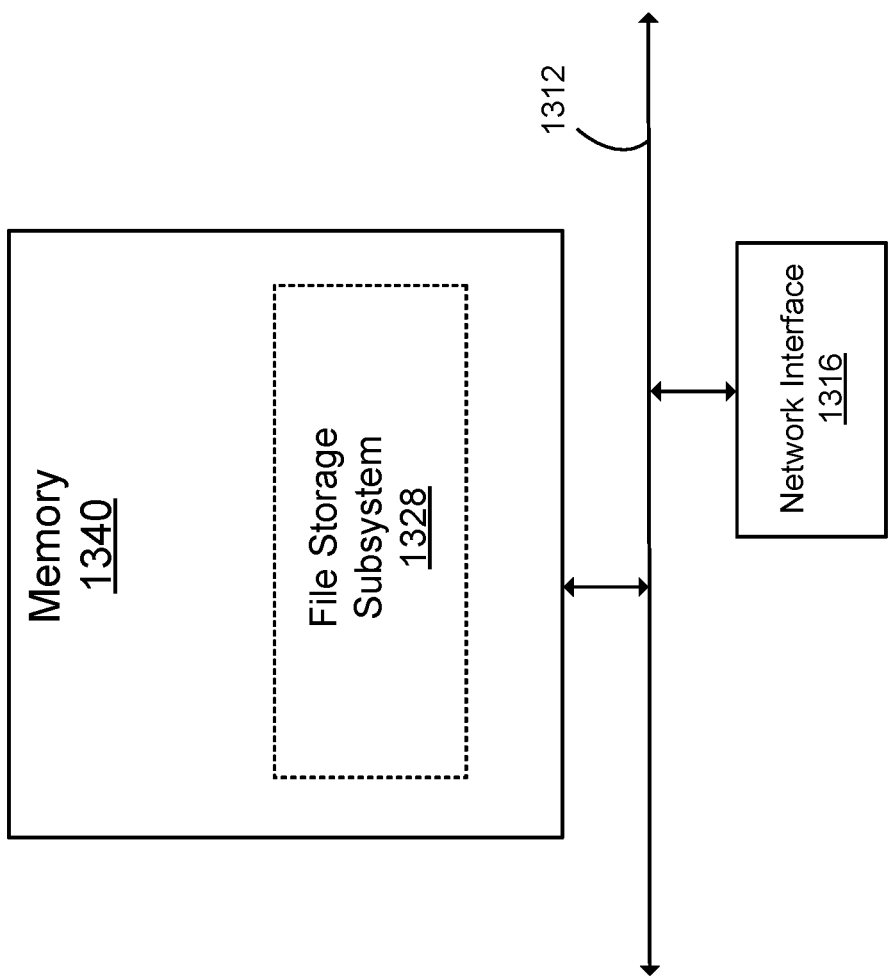

DETERMINISTIC MEMORY FOR TENSOR STREAMING PROCESSORS

CROSS-REFERENCE TO RELATED APPLICATIONS

This application claims a benefit and priority to U.S. Provisional Patent Application Ser. No. 63/219,145, filed on Jul. 7, 2021, entitled "High Bandwidth Memory for Tensor Streaming Processor", which is hereby incorporated by reference in its entirety.

TECHNICAL FIELD

The present disclosure generally relates to a processor architecture, and more specifically to a deterministic memory for tensor streaming processors.

BACKGROUND

Deep learning models can now recognize images, understand natural language, play games, and automate system decisions (e.g., device placement and indexing). Tensor operators, such as matrix multiplication and high dimensional convolution, are basic building blocks of deep learning models. Large machine learning and high-performance compute tasks require huge amounts of compute memory bandwidth and compute memory density. That memory capacity, however, comes at a high price in terms of power consumption. More efficient memory subsystems are needed.

Current central processing unit (CPU) and graphics processing unit (GPU) architectures are not deterministic and use out-of-order (OOO), speculative execution and other techniques in an endeavor to improve performance. Speculative execution, broadly speaking, is an execution model in which instructions can be fetched and enter the pipeline and even begin execution without even knowing for sure that they will indeed be required to execute (according to the control flow of the program). The term is also often used to specifically refer to speculative execution in the execution stage of the pipeline.

On the other hand, the OOO execution is an execution model in which instructions can be executed in an order that is potentially different from the program order. However, the instructions are still retired in program order so that the program's observed behavior is the same as the one intuitively expected by the programmer. This in turn requires a memory subsystem that is access-time compatible with the compute units and have high bit density to support large workloads. Such a memory subsystem comprises a hierarchy of static random-access memory (SRAM) caches (e.g., L1 and L2) to support high random access and a large dynamic random-access memory (DRAM) to support the large state space (i.e., storage capacity) with high bandwidth to fill the caches. For large tasks, as the state space is swapped into the caches, the bandwidth to the main memory becomes the limiting factor.

DRAM memory is one of the embodiments of a random transaction rate (RTR) memory. RTR represents the number of fully random memory accesses (reads or writes) that can be performed on the memory subsystem and is independent of the number of bits being accessed for the transaction (transaction bit width). RTR would be measured in million transactions per second or MT/s.

The traditional CPU/GPU memory subsystem requirements are the following: (i) high RTR caches with L1 cache that is access time compatible with compute units; (ii) high bit density main memory for task state space; (iii) high bandwidth from main memory to cache memory; (iv) low per-bit cost main memory that is expandable to variable amounts of memory. A conventional CPU/GPU memory hierarchy is shown in Figure (FIG. 1 and FIG. 2. Hierarchical memory subsystems that rely on multiple levels of caches are inherently inefficient.

Evolution of DRAM memory has been a response to the above stated requirements. The focus has been on large density at low cost per bit per package with increasing density and bandwidth to the CPU cache with each generation. However, the bandwidth of RTR has remained approximately the same—approximately 50 nanoseconds (ns) (i.e., access frequency of 20 MHz) for the past few decades.

DRAM is organized into many banks per chip. Only a certain number of banks can be active at any time. In each bank, the core accesses a large row, e.g., (1-8) KB, approximately every 50 ns (or with access frequency of 20 MHz) that is latched into the latching sense amp. The addressed word accessed by the relevant columns of sense amp latches into the chip data-buffer at, e.g., 200 MHz to 500 MHz. The word is then streamed out of the narrower chip data bus at a much higher frequency, e.g., 1.6 GHz to 3.2 GHz today.

Machine learning models are becoming larger, and the workloads increasingly require a large state space in weights and working states. For Natural Language Processing (NLP), recommendation models, language translation, and other similar models, the operational intensity seems to saturate (converge to a constant value) as model sizes increase. In contrast, for Computer Vision (CV) models, the operational intensity keeps increasing (because the compute requirements keep increasing) as model sizes increase. The arithmetic intensity, also referred to as operational intensity, is the ratio of the total floating points operations (the number of operations performed by a given kernel or application) to the memory traffic (the number of bytes of memory transfers incurred during the execution of the kernel or application).

SUMMARY

Embodiments of the present disclosure are directed to an integrated circuit with one or more deterministic streaming processors (e.g., tensor streaming processors (TSPs) or artificial intelligence processors) each having a functional slice architecture. In some embodiments, each deterministic streaming processor is configured to process a machine learning (ML) model. Each deterministic streaming processor is divided into a plurality of functional units organized into a plurality of functional slices. Each functional slice is configured to perform specific functions within the deterministic streaming processor, which may include memory functional slices (MEMs) for storing operand data, arithmetic functional slices for performing operations on received operand data (e.g., vector processing, matrix manipulation), and/or the like. Functional units of the deterministic streaming processor are configured to stream operand data across a first (e.g., temporal) dimension in a direction indicated in a corresponding instruction, and receive instructions across a second (e.g., spatial) dimension. The compiler for the deterministic streaming processor is aware of the hardware configuration of the deterministic streaming processor, and configures the timing of data and instruction flows such that corresponding data and instructions are intersected at each computational element at a predetermined time. Each functional slice of the deterministic streaming processor may operate on a set of data lanes in a Single Instruction Multiple Data (SIMD) manner. The set of data lanes can be referred to herein as a "superlane" and represents a cross-section of all the functional slices on a processor chip.

The TSP architecture is deterministic, and the memory accesses are therefore deterministic as well. Given the unprecedented compute density enabled by the TSP architecture, for the requisite operational intensity of the ML models, the TSP's architecture also supports unprecedented memory bandwidth. As a single core architecture, the TSP device supports an extremely high bandwidth, chip-wide data path that allows all compute elements in the chip to have access to a global memory space directly without a cache hierarchy.

The TSP is uniquely positioned to enable use of dynamic random-access memory (DRAM), magneto-resistive random-access memory (MRAM), NOR flesh memory, etc. as near-compute memory to directly compute from without a cache hierarchy. Given the simple requirements of the TSP memory access, by using DRAM as near-compute memory, the TSP architecture enables simplification of the DRAM architecture while improving bandwidth, concurrency, power and per-bit cost for DRAM over existing DRAM architectures.

The TSP has significantly higher computer density, for example, approximately seven times better compute density per transistor, and significantly improved memory bandwidth compared to the dominant commercially available graphics processing unit (GPU) incumbent. Balancing memory capacity for such large tasks with high compute density such as that of the TSP's architecture suggests the use of high-density memories such as DRAM as a preferred compute memory.

The TSP architecture being deterministic uniquely allows for use of memories such as DRAM (and even slow non-volatile memory (NVM) such as MRAM, NOR flesh memory, etc.) that are much slower in random access but do enable extremely high density per device at much lower bit cost to be used as near-compute memory. This coupled with the TSP architecture's high bandwidth global data path mated with stacking technologies allows for coupling the high-density memories (like DRAM) directly to the compute units in the TSP single core. The result is an extremely high-density compute engine coupled to an extremely high density near-compute memory with an extremely high bandwidth data path enabling a device that is balanced in compute density, memory bandwidth and memory density. This allows for use of a significantly smaller number of devices for large tasks resulting in a significantly lower accessory (like host processors, storage, networking, power subsystems etc.) usage and correspondingly lower energy consumption.

Because many modern high-performance reduced instruction set computer (RISC), complex instruction set computer (CISC) and GPU architectures are not deterministic, they cannot directly use DRAM because the effective random transaction rate (RTR) is too slow (e.g., approximately 25M RTR/s corresponding to Row Cycle Time (tRC) of 40 ns)—these architectures require a cache hierarchy wherein the caches provide the RTR required. Also, because these competing architectures use the large number of cores and do not have a high bandwidth global data path like the TSP, they cannot use high bandwidth stacking techniques to access DRAM as a global addressable space. Global data path means that the switching network is substantially exclusively located on the processor die. Global addressable space means that each memory address is globally accessible to the processor independent of which bank the data is stored. Thus, the prior art RISC, CISC and GPU architectures can use only a set of banks for each core but not as global memory. Also, because the prior art DRAM RTR is too low, DRAM banks cannot be used as a local cache in the hierarchy.

Embodiments of the present disclosure relate to a deterministic streaming system (e.g., TSP system) with one or more deterministic streaming processors (e.g., one or more TSP chips or cards) each comprising an array of processing elements (e.g., functional slices) and a first deterministic memory (e.g., static memory or static random-access memory) communicatively coupled to the array of processing elements. The deterministic streaming system further includes a second deterministic memory (e.g., dynamic memory or DRAM) communicatively coupled with the array of processing elements, and a controller communicatively coupled with the second deterministic memory. The second deterministic memory includes a plurality of data banks having a global memory address space for the one or more deterministic streaming processors. The controller may initiate retrieval of first data from the plurality of data banks of the second deterministic memory as a first plurality of streams, each stream of the first plurality of streams streaming toward a respective group of processing elements of the array of processing elements. The controller may further initiate writing of second data to the plurality of data banks of the second deterministic memory as a second plurality of streams, each stream of the second plurality of streams streaming from the respective group of processing elements toward a respective data bank of the second deterministic memory. The first deterministic memory and the second deterministic memory together form a deterministic memory of the deterministic streaming system.

Embodiments of the present disclosure further relate to a process (or method) of deterministic computing at a deterministic streaming system (e.g., TSP system). The process includes: initiating streaming of data between a first deterministic memory of a deterministic streaming processor (e.g., TSP chip or card) of the deterministic streaming system and an array of processing elements of the deterministic streaming processor; initiating retrieval of first data from a plurality of data banks of a second deterministic memory of the deterministic streaming system as a first plurality of streams, each stream of the first plurality of streams streaming toward a respective group of processing elements of the array of processing elements; and initiating writing of second data to the plurality of data banks as a second plurality of streams, each stream of the second plurality of streams streaming from the respective group of processing elements toward a respective data bank of the second deterministic memory.

Embodiments of the present disclosure further relate to a non-transitory computer-readable storage medium having stored thereon executable instructions, which when executed by a computer processor cause the computer processor to: initiate streaming of data between a first deterministic memory of a deterministic streaming processor of a deterministic streaming system and an array of processing elements of the deterministic streaming processor; initiate retrieval of first data from a plurality of data banks of a second deterministic memory of the deterministic streaming system as a first plurality of streams, each stream of the first plurality of streams streaming toward a respective group of processing elements of the array of processing elements; and initiate writing of second data to the plurality of data banks as a second plurality of streams, each stream of the second plurality of streams streaming from the respective group of processing elements toward a respective data bank of the second deterministic memory.

BRIEF DESCRIPTION OF THE DRAWINGS

Figure (FIG. 1 depicts a prior art typical central processing unit/general purpose unit (CPU/GPU) memory hierarchy of a computer system.

FIG. 13B is another abstract diagram of a computer system suitable for enabling embodiments of the claimed disclosures for use in commerce, in accordance with some embodiments.

Figure 1:
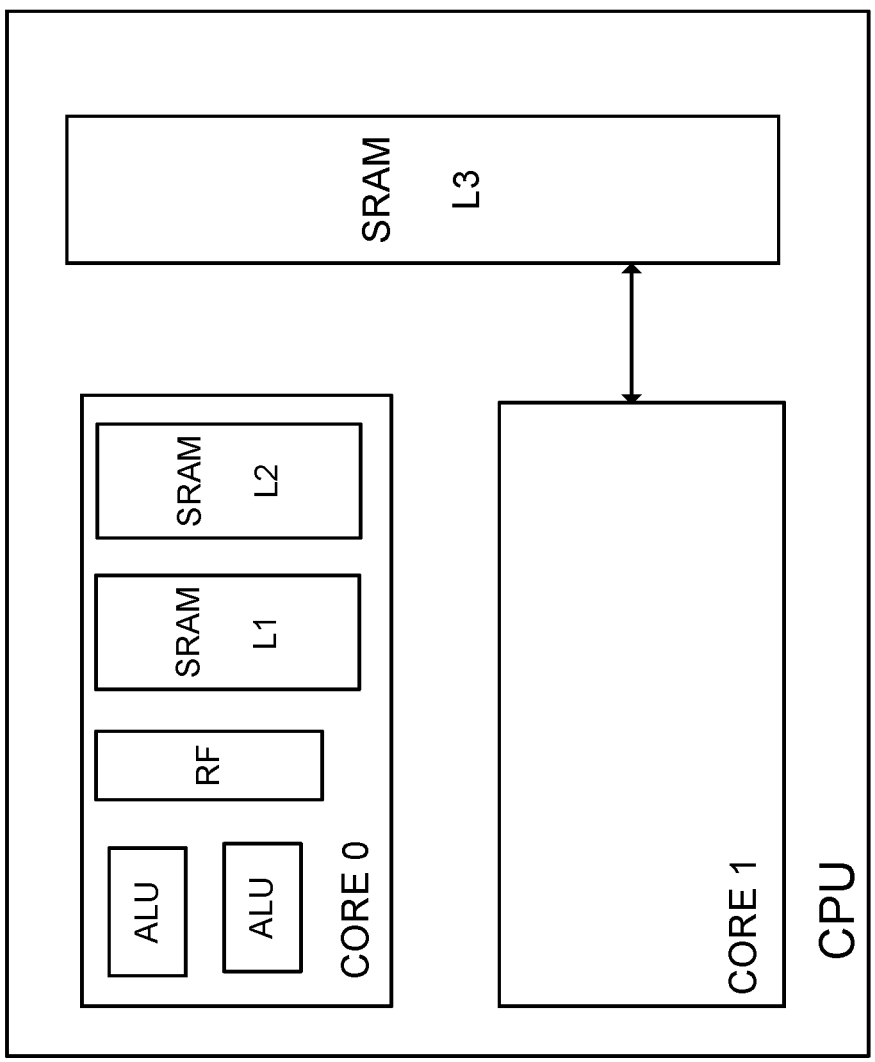
Figure 2:
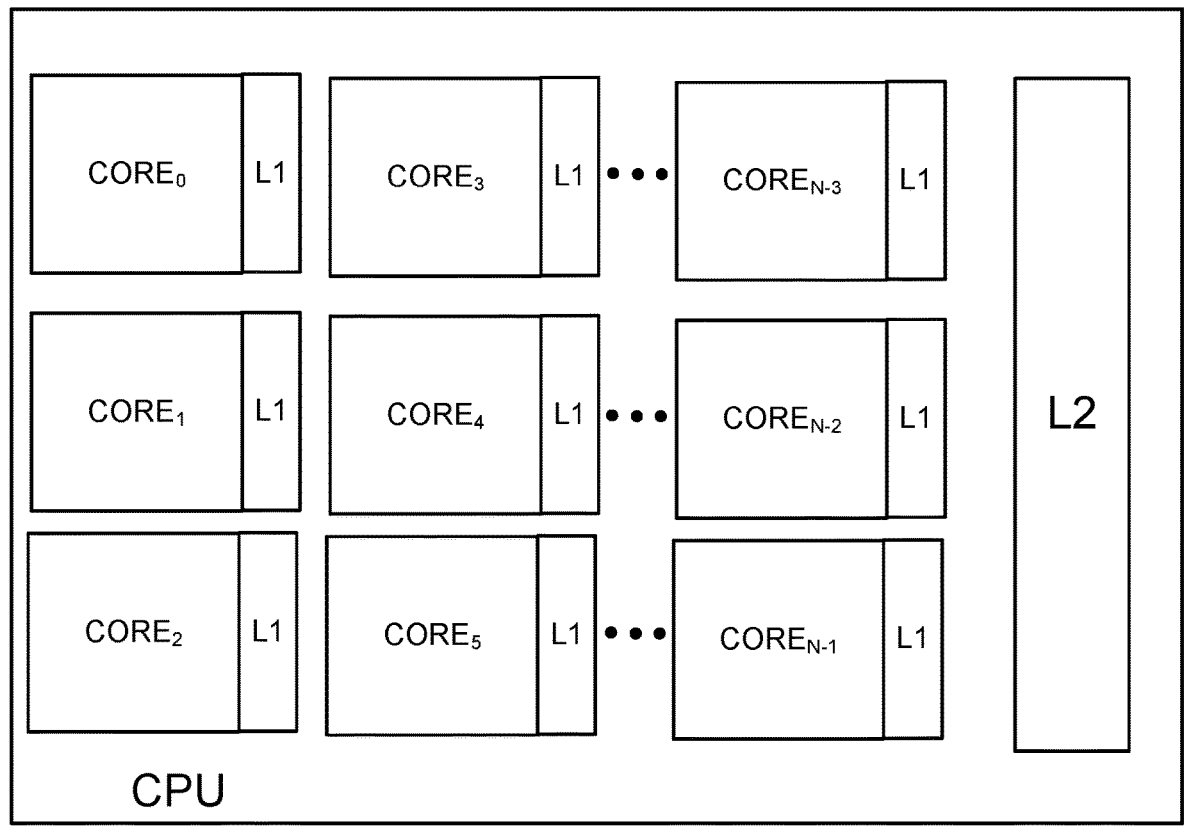
FIG. 2 illustrates a prior art typical CPU/GPU memory hierarchy of a computer system with large number of cores for use in commerce.
Figure 2:
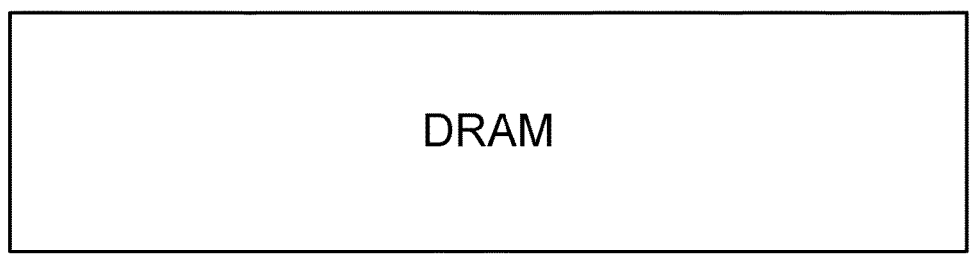

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

OVERVIEW

Disclosed are configurations that include an integrated circuit with one or more deterministic streaming processors (e.g., tensor streaming processors (TSPs) or artificial intelligence processors). Each deterministic streaming processor may have a functional slice architecture. In some embodiments, each deterministic streaming processor is configured to process a machine learning model. Each deterministic streaming processor may be divided into a plurality of functional units. The functional units may be organized into a plurality of functional slices. Each functional slice may be configured to perform specific functions within the deterministic streaming processor. The deterministic streaming processor may include memory functional slices (MEMs) for storing operand data, arithmetic functional slices for performing operations on received operand data (e.g., vector processing, matrix manipulation), and/or the like. Functional units of the deterministic streaming processor may be configured to stream operand data across a first (e.g., temporal) dimension in a direction indicated in a corresponding instruction, and receive instructions across a second (e.g., spatial) dimension. The compiler for the deterministic streaming processor may be aware of the hardware configuration of the deterministic streaming processor, and may configure the timing of data and instruction flows such that corresponding data and instructions are intersected at each computational element at a predetermined time. Each functional slice of the deterministic streaming processor may operate on a set of data lanes in a Single Instruction Multiple Data (SIMD) manner. The set of data lanes can be referred to herein as a "superlane" and represents a cross-section of all the functional slices on a processor chip.

The disclosed embodiments are directed to one or more deterministic streaming processors each having a functional slicing architecture. In some embodiments, each deterministic streaming processor comprises a tensor streaming processor (TSP) having a functional slicing architecture, which can be used for hardware-accelerated machine learning (ML) applications.

The deterministic streaming processor (e.g., TSP) may comprise a plurality of "computational elements," each computational element corresponding to a functional unit within the deterministic streaming processor. The on-chip memory and network-on-chip (NoC) of the deterministic streaming processor architecture may be fused to provide both storage of operands and results, and may act as a conduit for transferring operand and/or result data to/from the functional units of the deterministic streaming processor. The computational elements of the deterministic streaming processor may be divided between different functionalities (e.g., memory, arithmetic operation, etc.), and may be organized as functional slices which operate on multi-dimensional data (e.g., tensors). For example, each functional slice may be composed from computational elements which border (or abut) each other, both horizontally and vertically, to form the functional slice. The number of computational elements and computation granularity of each computational element may be selected to take advantage of the underlying technology on which it is built. Taken together, the number of computational elements (N) and the word granularity (M) of a memory (e.g., static random-access memory (SRAM)) yields the vector length (VL) of the machine.

In some embodiments, each functional slice of the deterministic streaming processor functions independently, and receives instructions from an instruction control unit (ICU). The ICU may pass instructions to a first computational element of the functional slice, which may be then propagated in a first temporal dimension of the deterministic streaming processor along the functional slice to the remaining computational elements of the functional slice. On the other hand, data operands for storage and/or processing may be passed between different functional slices of the deterministic streaming processor, in a second spatial dimension of the deterministic streaming processor perpendicular to the first temporal dimension. As such, the data flow and the instruction flow of the deterministic streaming processor may be separate flows.

In some embodiments, a compiler for the deterministic streaming processor is aware of the hardware configuration of the deterministic streaming processor, and synchronizes the timing of data and instruction flows such that corresponding data and instructions are received at each computational element with a predetermined temporal relationship (e.g., during the same clock cycle, separated by a predetermined delay, etc.). In some embodiments, the predetermined temporal relationship is based upon the hardware of the deterministic streaming processor, a type of instruction, and/or the like. Because the temporal relationship between data and instructions are known by the compiler, the operand data received by a computational element may not include any metadata indicating what the data is to be used for or where the data is to be consumed. Instead, each computational element may receive instructions, and based upon the predetermined timing, may perform the instruction on the current data held by a register associated with the computational element. This allows for the data and instructions to flow through the deterministic streaming processor more efficiently.

Embodiments of the present disclosure are directed to implementation of a deterministic memory for a deterministic streaming system (e.g., TSP system) with one or more deterministic streaming processors (e.g., one or more TSP chips or cards). Each deterministic streaming processor includes an array of processing elements and a first deterministic memory (e.g., on-chip deterministic memory or static memory) coupled to the array of processing elements. The deterministic streaming system further includes a memory controller and a second deterministic memory (e.g., off-chip deterministic memory or dynamic memory). The second deterministic memory may include multiple data banks and may have a global memory space for the one or more deterministic streaming processors of the deterministic streaming system. The deterministic memory may be implemented as, e.g., one or more three-dimensional stacks of High Bandwidth Memory devices. A memory controller may initiate retrieval of first data from the data banks of the second deterministic memory as a first plurality of streams, each stream of the first plurality of streams streaming toward a respective group of processing elements of the array of processing elements. The memory controller may further initiate writing of second data to the plurality of data banks of the second deterministic memory as a second plurality of streams, each stream of the second plurality of streams streaming from the respective group of processing elements toward a respective data bank of the second deterministic memory. The first deterministic memory and the second deterministic memory together form a deterministic memory for the deterministic streaming system.

Architectural Overview of Tensor Streaming Processor

Figure 3A:
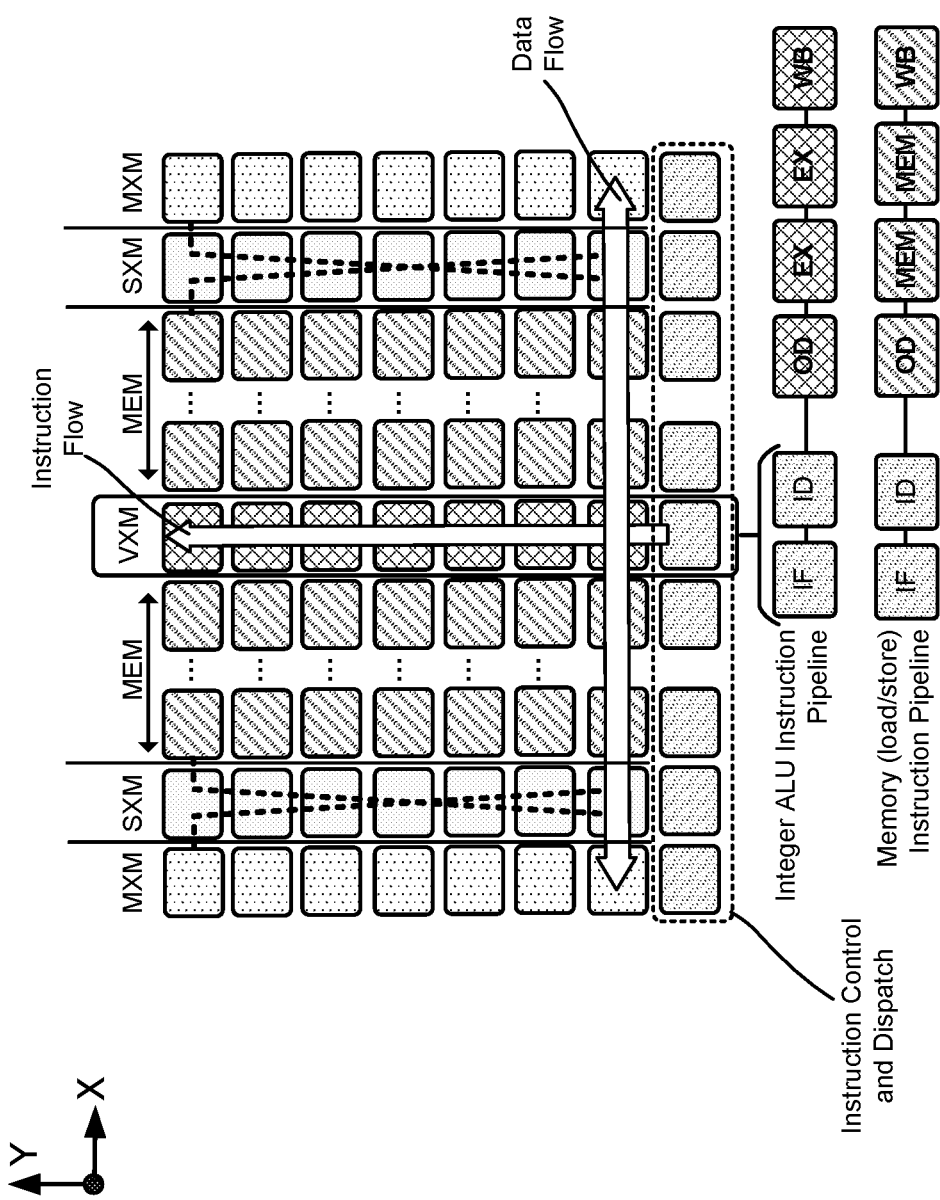
FIG. 3A illustrates an arrangement of functional slices in a tensor streaming processor (TSP), in accordance with some embodiments.

In accordance with embodiments of the present disclosure, the deterministic streaming processor plane comprises a TSP, e.g., as may be commercially available from GROQ, INC. of Mountain View, California. It is to be understood that although many embodiments described herein use a TSP as the preferred deterministic streaming processors, other deterministic streaming processors may be used in commercial applications. Figure (FIG. 3A shows an arrangement of functional slices in a TSP, in accordance with some embodiments.

Certain core architectural elements set the TSP apart from GPU and accelerators. In a conventional chip multiprocessor (CMP), each "computational element" is an independent core that is interconnected using the on-chip network to exchange data between cores. Instruction execution is carried out over several stages: (i) instruction fetch (IF), (ii) instruction decode (ID), (iii) execution (EX) on Arithmetic Logic Units (ALUs), (iv) memory access (MEM), and (v) writeback (WB) to update the results in the general-purpose registers (GPRs).

In contrast from conventional multicore, where each computational element is a heterogeneous collection of functional units but globally homogeneous, the TSP inverts that to have a local functional homogeneity but chip-wide (global) heterogeneity. More specifically, the TSP reorganizes the homogeneous two-dimensional mesh of cores into the functionally sliced microarchitecture shown in FIG. 3A. In this approach, each computational element implements a specific function and is stacked vertically into a specific "functional slice" in one dimension (e.g., the Y-dimension) of the two-dimensional on-chip mesh. The TSP disaggregates the basic elements of the conventional multicore per their respective functions: instruction control and dispatch (e.g., via instruction control unit (ICU)), memory (MEM), integer (INT) arithmetic, floating point unit (FPU) arithmetic, and network (NET) interface. Each row of the two-dimensional on-chip mesh contains a cross section of all functional slices.

In this organization, each functional slice is independently controlled by a sequence of instructions specific to its on-chip role. For instance, the MEM functional slices support Read and Write but not, necessarily Add or Mul, which are typically performed in arithmetic functional slices (e.g., the vector execution module (VXM) and matrix execution module (MXM) functional slices) for some typical machine learning (ML) algorithms, such as the linear regression algorithm.

All functional slice's computational elements execute the same instruction stream—Single Instruction Multiple Data (SIMD) instructions. Thus, the common instruction decode and dispatch logic can be factored out into its own computational element (e.g., ICU) and decompose the normal instruction execution pipeline into two areas: (i) instruction fetch, decode, and parceling; and (ii) operand read, execute, and writeback. This approach decouples the memory subsystem from the functional units retrieving their operands and depositing results.

In some embodiments, each functional slice implements, e.g., a 20-stage vector pipeline that spans the computational elements of each functional slice, with each computational element producing 16 elements of the 320-element maximum vector length. This organization naturally decomposes instruction flow in the vertical dimension, and data flow in the horizontal dimension as the data flow passes over different function types. With this processor organization, instruction execution may be carried out by different computational elements: instruction fetching and decoding in the ICU and operand decode, execution and writeback at each computational element of the functional slice as the (vertical flowing) dispatched instruction intersects with the (horizontal flowing) operand data on which the dispatched instruction is operating. It will be appreciated that reference to 'vertical' and 'horizontal' or 'north', 'south', 'east' and 'west' are used in connection with the illustrations shown in the Figures, are abstractions that are solely intended to aid the reader and should not be inferred as technical limitations.

Figure 3B:
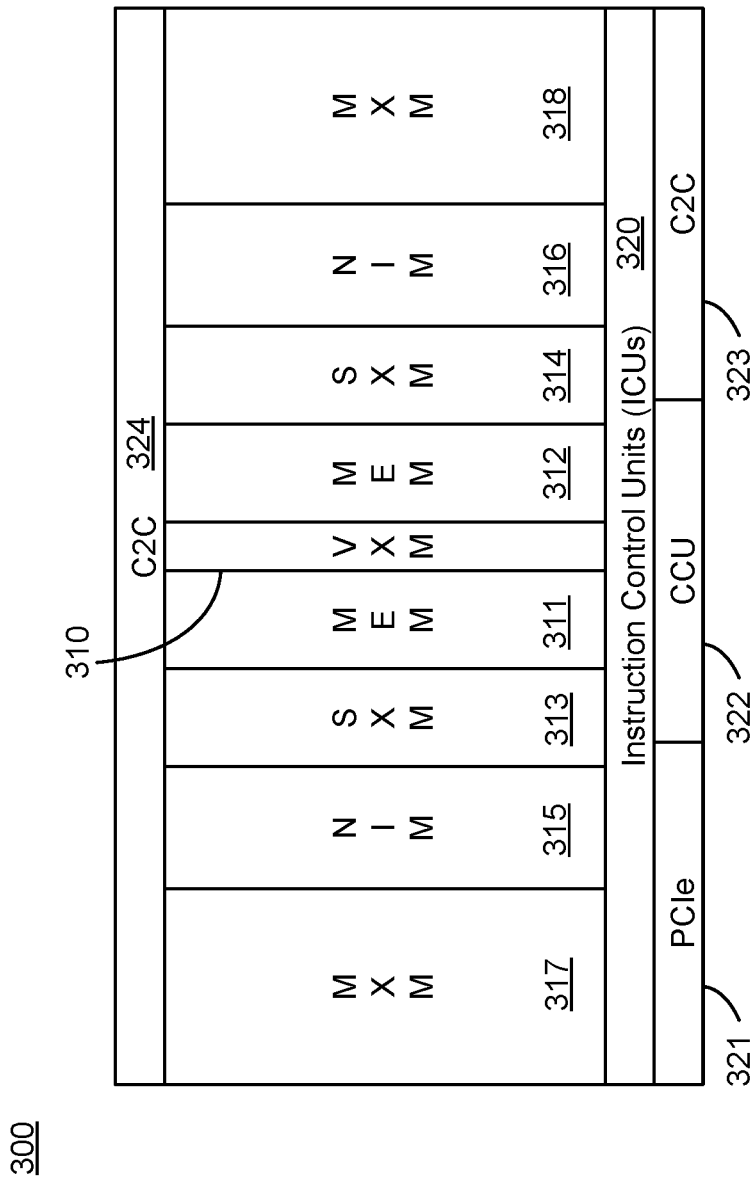
FIG. 3B illustrates an example TSP architecture, in accordance with some embodiments.

FIG. 3B illustrates an example TSP 300, in accordance with some embodiments. The TSP 300 may include memory and arithmetic units optimized for multiplying and adding input data with weight sets (e.g., trained or being trained) for machine learning applications (e.g., training or inference). For example, the TSP 300 includes a VXM 310 for performing operations on vectors (i.e., one-dimensional arrays of values). Other elements of the system are arranged symmetrically on either side of the VXM 310 to optimize processing speed. For example, the VXM 310 may be adjacent to MEMs 311-312 and SXMs 313-314 to control routing of data, data domain and presentation controllers (or numerical interpretation modules (NIMs)) 315-316, and MXMs 317-318. An ICU 320 may control the flow of data and execution of operations across blocks 310-318, for example. The TSP 300 may further include communications circuits such as chip-to-chip (C2C) circuits 323-324 and an external communication circuit (e.g., PCIe) 321. The TSP 300 may, for example, further include a chip control unit (CCU) 322 to control boot operations, clock resets, and other low level setup operations.

Figure 3C:
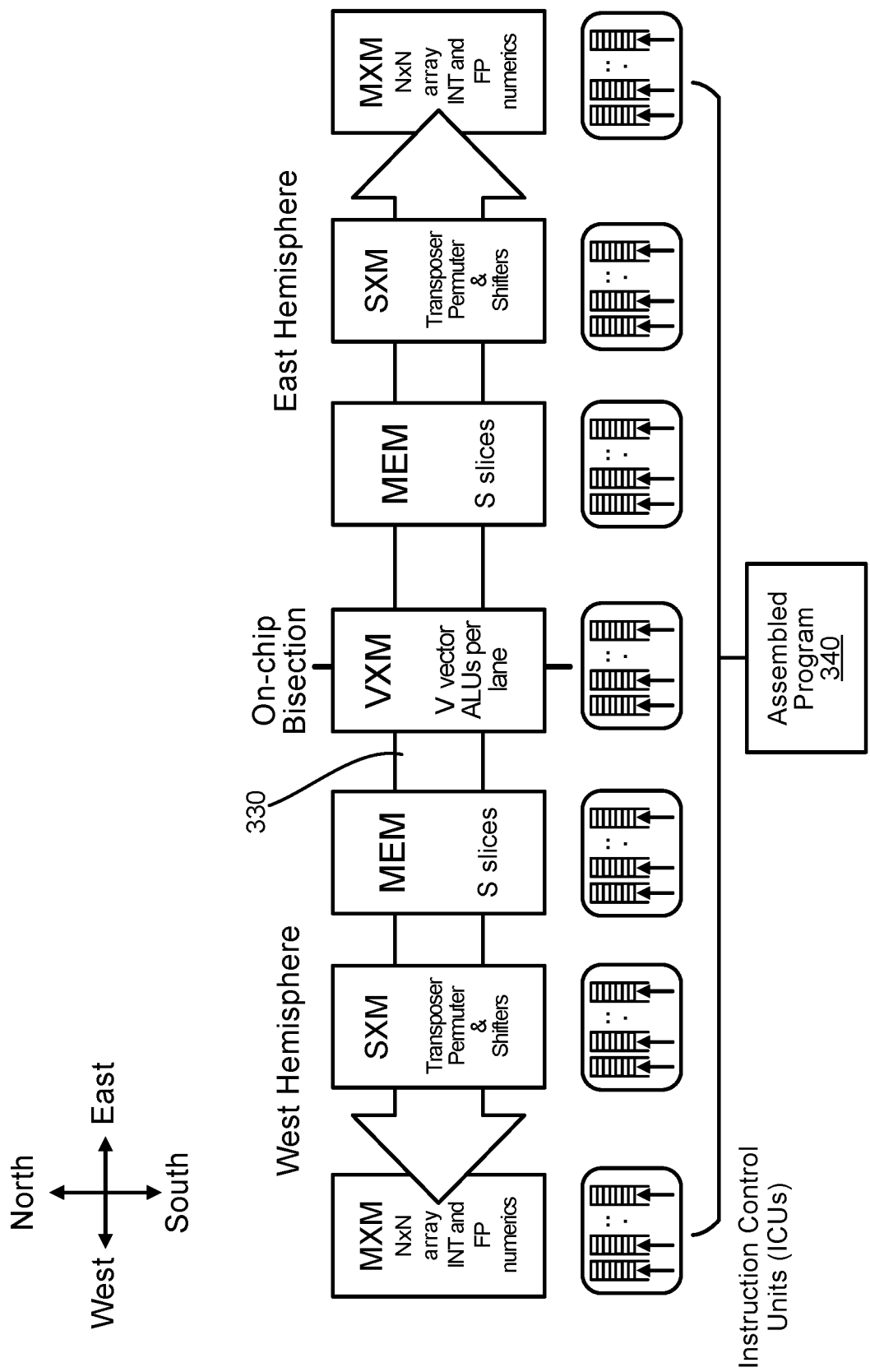
FIG. 3C illustrates organization and data flow within a row of a TSP, in accordance with some embodiments.

FIG. 3C illustrates organization and data flow within a row of the TSP 300, in accordance with some embodiments. As shown in FIG. 3C, each row of the two-dimensional on-chip mesh of the TSP 300 contains a cross section of all functional slices, e.g., N×N array of MXMs (e.g., N=320) configured for both integer (INT) and floating-point (FP) numerics (e.g., INT8 and FP16), S MEM functional slices (e.g., S=44), VXM functional slices with V vector ALUs per lane (e.g., V=16), and SXM functional slices. In this organization, each functional slice may be independently controlled by a sequence of instructions specific to its on-chip role fetched by a corresponding array of ICUs (e.g., a total of I=144 ICUs). Conceptually, the functional slices may be fixed and data 330 may be flowing across their computational elements. As the data flows through a specific functional slice, each functional slice can optionally intercept the data operands and compute a result (e.g., in case of MXM and VXM), or move data between data transport lanes on the network (e.g., in case of SXM and MEM). Instructions flow northward from the ICUs to the functional slices, while data (operands and results) primarily flow east and west between functional slices. Any inter-lane data movement within a vector uses the on-chip network functional slice.

It is noted that the "east-west-north-south" directionality is provided herein for ease of discussion and relativity. Furthermore, the "east-west-north-south" directionality is used as a reference for explanation of processing flow as described herein and is not intended to be limited with respect to a label of a particular direction. For example, the north-south direction (i.e., direction along the vertical or Y-dimension) could be reoriented to the east-west direction (i.e., direction along the horizontal or X-dimension) and the principles currently described with east-west directionality could apply to the reoriented north-south directionality. In another example of the directionality not intended to be limited to the description per the reference noted, directionality could be referenced such that north-south is up-down and east west is right-left and the principles would accordingly apply.

In one embodiment, 320 lanes are overlaid on the TSP 300 where each computational element in the on-chip mesh operates on, e.g., 16-lanes in a SIMD manner. The 16-lane unit can be referred to herein as a "superlane" and represents a cross-section of all the functional slices on the chip. As such, a superlane may represent the architecture's minimum vector length (minVL) of, e.g., 16 elements. Likewise, the vertical composition of 20 tiles forming a functional slice may produce a maximum vector length (maxVL) of, e.g., 20×16=320 functional units. Each of the 144 independent on-chip ICUs can issue one or more instructions per clock cycle. The compiler may have the explicit control of a program order in each instruction queue, e.g., by generating an assembled program 340 for execution by the ICUs and functional slices. There can be, e.g., 64 logical streams per lane for moving operands or results on-chip with 32 streams eastward and 32 streams westward. The 220 MB of globally shared SRAM may deliver 32 bytes per lane of stream bandwidth and low-latency access to model parameters. For example, MEM can read and MXM can install more than e.g., 100,000 weights into a 320×320 array (i.e., 320 lanes× 320 functional units) in less than 30 clock cycles including SRAM and on-chip network transit delays.

As shown in FIG. 3B and FIG. 3C, the on-chip network can be implemented as X-dim mesh and Y-dim mesh of computational elements with X-Y-X dimension order routing. Each instruction may specify the first hop direction (east or west), so memory instruction semantics have both an address and a dataflow direction. Streams may be routed in the X-dimension through MEM 311/312 and routed in the Y-dimension using the SXM's 313/314 permuter and lane-shifters to move data elements vertically. The SXM's 313/ 314 permuter implements a permutation function that is a mathematical technique that determines the number of possible arrangements in a set when the order of the arrangements matters. Common mathematical problems involve choosing only several items from a set of items with a certain order.

The MEM 311/312 and the SXM 313/314 may provide deterministic routing of stream data as the stream data flows in the X and Y dimensions, respectively. With the TSP architecture 300, functional slices may interact with streams of data in a producer-consumer fashion. That is, the functional slices may consume operands from streams and produce results onto a (possibly different) stream, like an assembly line operator (functional slice) and conveyor belt (stream).

Conceptually, the functional slices can be fixed and data can flow across computational elements as shown in FIG. 3C. As the data flows through the functional slice, each computational element can optionally intercept the data operands and compute a result (if the computational element comprises an arithmetic logic unit (ALU)) or move data between lanes on the network if the computational element comprises a switching element.

Streams may provide a programming abstraction and are a conduit through which data flows between functional slices. Unlike GPRs, the functional slices may operate on streams of parallel data flowing east or west (horizontally) across the chip. The horizontally flowing streams carrying operands may intercept the vertically (northward) flowing instructions (see FIG. 3C) to perform a computation at a computational element on a functional slice. A compiler accurately maintains the chip's architectural state and uses that knowledge to ensure that instructions correctly intercept its stream operand(s).

Streams may be implemented in hardware by a chip-wide streaming register file. Streams may be architecturally visible and transport operands and results between functional slices. A common software pattern may involve reading operand data from one or more MEM functional slices that is then subsequently consumed and operated on by a downstream arithmetic functional slice. The results of the operation may be then produced onto another stream such that they can be written back to memory or passed to subsequent computational elements. For example, a Z=X+Y operation may require four instructions: Read S1, X and Read S2, Y are executed on two MEM functional slices and directed inward toward an ALU functional slice to perform the Add S1, S2, S3. Lastly, the result can be stored back to memory via a Write S3, Z. The streams may represent a collection of N-elements, operated upon in a SIMD manner by each functional slice.

By way of example, a TSP architecture makes several deliberate tradeoffs on the hardware-software interface, pushing the complexities associated with scheduling into the compiler. Specifically, it falls on the compiler to precisely schedule instructions to use the hardware correctly and efficiently. At times this may involve selecting one of several means by which an algorithm or meta-operation may be realized on the hardware. Removing the control complexity of dynamic instruction scheduling for multi-issue execution units allows the ICU to be relatively small, accounting for, e.g., less than 3% of the chip area.

Figure 5:
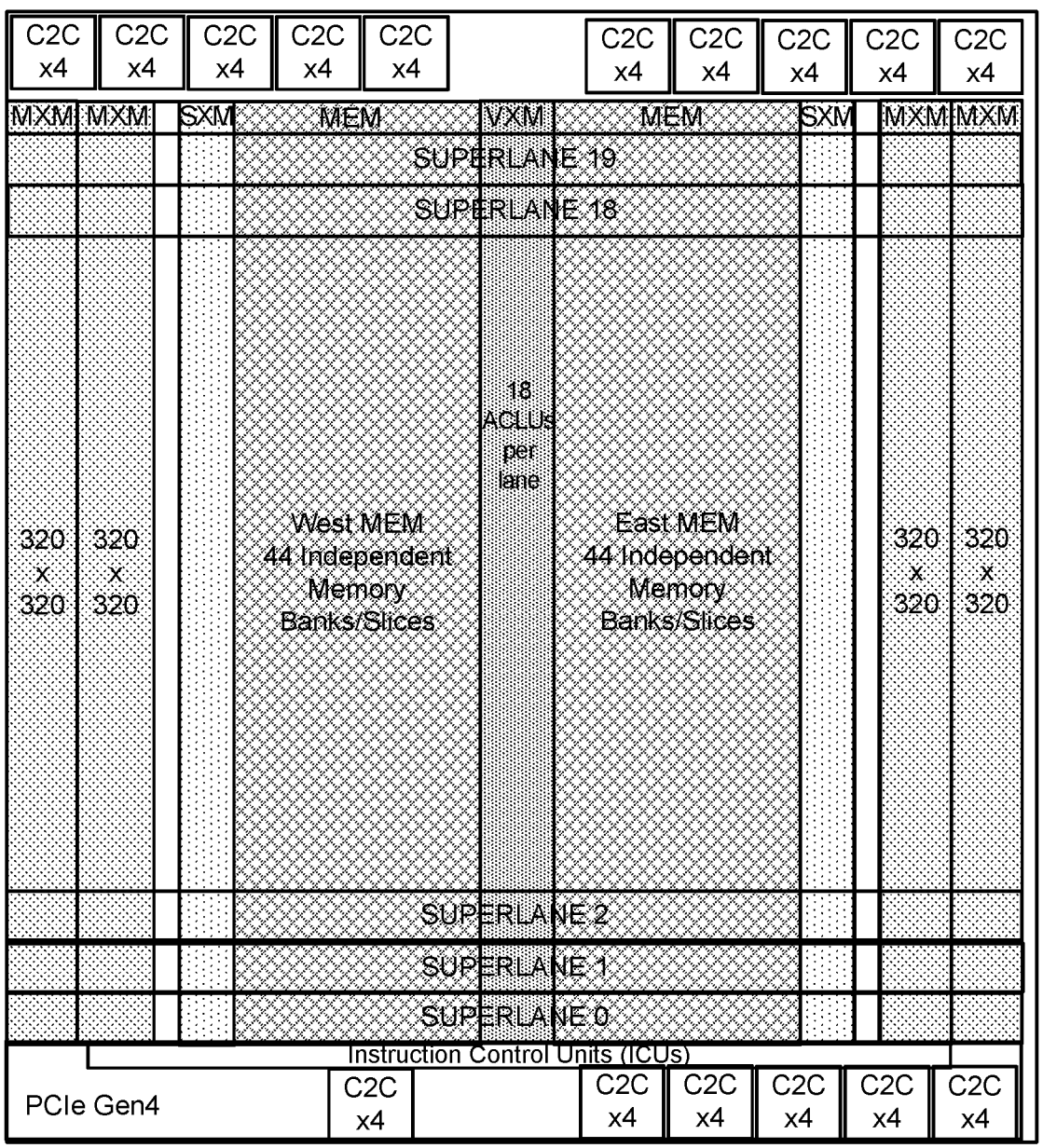
FIG. 5 illustrates a die photo of an ASIC implementation of a TSP, in accordance with some embodiments.
Figure 5:

The compiler may have access to, e.g., 320-lane programming abstraction overlaid on a TSP architecture (e.g., the TSP 300 in FIG. 3B or a TSP die 500 in FIG. 5) where each computational element in the on-chip mesh operates on 16-lanes in a SIMD manner. The 16-lane unit can be referred to as a "superlane" which is a cross-section of all the functional slices on the chip and the minimum granularity of computation. As such, a superlane represents the architecture's minimum vector length, minVL, of 16 elements. Likewise, the vertical composition of 20 tiles to form a functional slice (see the TSP die 500 in FIG. 5) produces a maximum vector length, maxVL, of, e.g., 20×16=320 elements.

The compiler has access to, e.g., 144 independent instruction queues (i.e., ICUs) on-chip: (a) six for westward MXM including two independent two-dimensional MAC (multiply-accumulate) arrays; (b) 14 for westward SXM for intra-superlane and inter-lane switching by rearranging elements of vectors; (c) 44 for westward MEM including 44 parallel functional slices of static random-access memory (SRAM); (d) 16 for VXM including 16 vector ALUs per lane; (e) 44 for eastward MEM—including 44 parallel functional slices of SRAM; (f) 14 for eastward SXM; and (g) six for eastward MXM including two independent two-dimensional MAC arrays, whereas each instruction queue can issue one or more instructions per cycle and the compiler has explicit control of the program order in each instruction queue.

Figure 4:
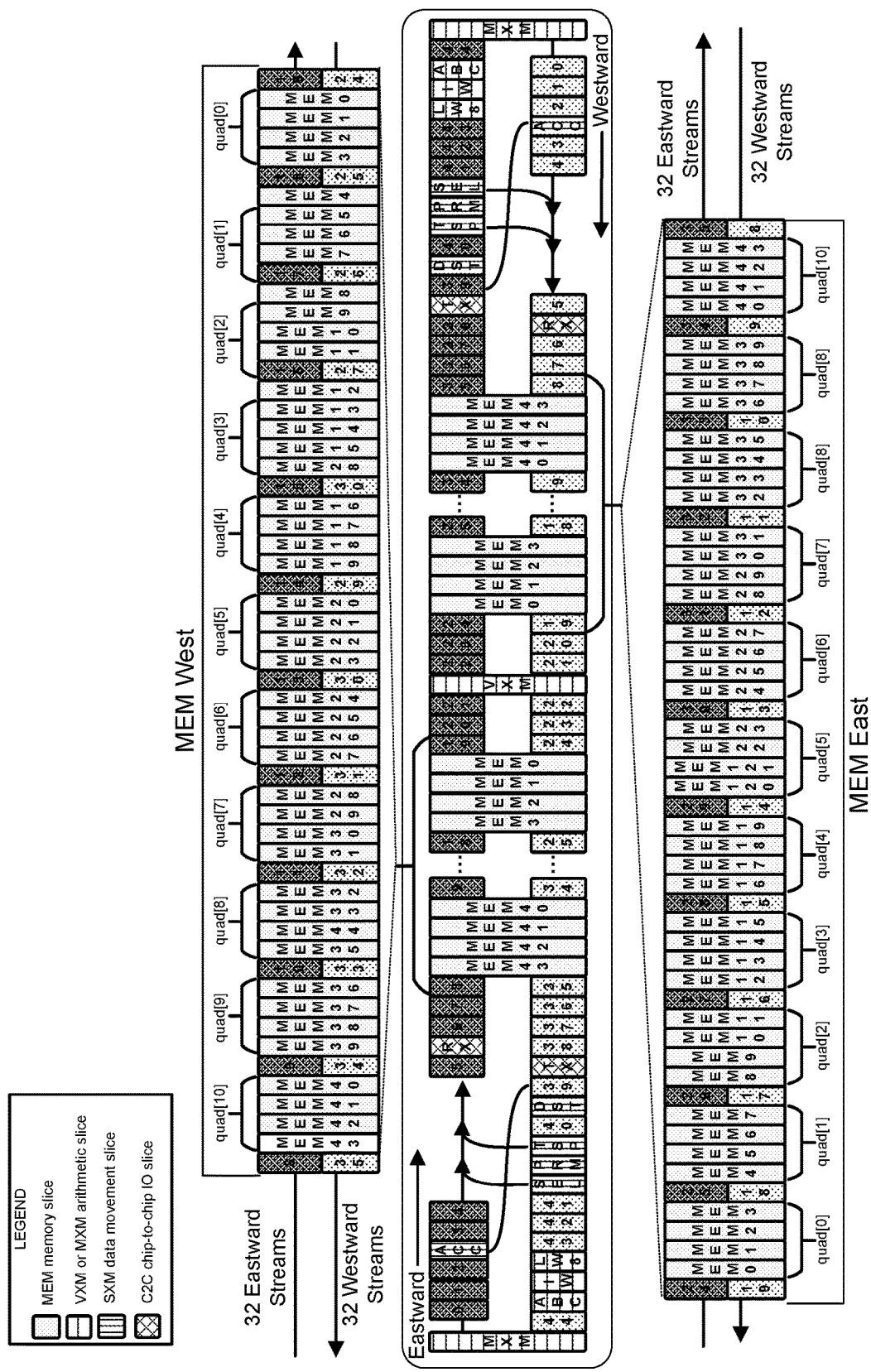
FIG. 4 depicts stream registers of a TSP that are numbered to show their locations between functional slices within a superlane, in accordance with some embodiments.

The compiler may have access to, e.g., 64 logical streams per lane. For example, 32 logical streams may be required to operate on 16 minVL per lane for moving operands or results on-chip with 32 streams eastward, and 32 streams westward, as shown in FIG. 4.

The compiler may have access to, e.g., 220 MBytes of globally shared SRAM, in one embodiment, that delivers 32 bytes per lane of stream bandwidth and low-latency access to model parameters. For example, MEM can read and MXM can install 400 K weights into all four 320×320 arrays in less than 40 operational cycles including SRAM and on-chip network transit delay.

Streams may be designated by both an identifier (0, . . . , 31) and direction. For example, in(28) designates stream 28 inward, and out(24) designates stream 24 toward the outward edge of the chip. The direction of a stream may be designated as inward (toward the chip bisection) or outward (toward the outward edge of the chip), or the direction may be designated as eastward or westward, as shown in FIG. 3C and FIG. 4.

The components of a superlane can be organized spatially as shown in FIG. 3C. The instruction set architecture (ISA) of the TSP defines instructions spanning different functional areas. The partitioned global address space (PGAS) presented by the MEM functional slices provides memory semantics for vectors to be addressed from SRAM and loaded into an architecturally visible stream with a direction of dataflow toward the functional slice intending to operate on them.

The first functional area (i.e., ICU) may provide explicit instruction fetching with IFetch instruction(s), and inter-slice synchronization using Sync and Notify instructions to perform chip-wide barrier synchronization among participating functional slices. A repeated-NOP (no-op) instruction allows for precise cycle-by-cycle control of inter-instruction delay. For example, the compiler may have cycle-accurate control when scheduling two operations A and B using an intervening NOP so that N cycles separate them, e.g., OpA NOP(N) OpB.

The second functional area (i.e., VXM) may consist of, e.g., a 4×4 mesh of ALUs in each lane for pointwise arithmetic operations.

The third functional area (i.e., MXM) may consist of, e.g., four independent two-dimensional MAC arrays that operate on INT8, FP16 or FP32 data types.

On-chip data movement may use the fourth functional area (i.e., SXM) for intra-superlane and inter-lane switching by rearranging elements of vectors. The SXM may be analogous to the NET interface to communicate between cores in FIG. 3A. Together the MEM and SXM may work in tandem to form the X-Y dimensional movement of data across the on-chip network.

The fifth functional area (i.e., the east and west hemisphere of on-chip MEM module) may be composed of, e.g., 44 parallel MEM functional slices of SRAM and can provide the memory access concurrency necessary to fully utilize the 32 streams in each East or West direction. Each functional slice may provide 13-bits of physical addressing of 16-byte memory words, and each byte may map to a lane for a total of, e.g., 220 MBytes of on-chip SRAM.

An additional sixth functional area may include C2C modules configured to provide Send and Receive primitives for exchanging 320-byte vectors between a pair of TSP chips. One possible TSP implementation (e.g., the TSP die 500) has, e.g., a total of 16×4 links operating at 30 Gbps each for a total off-chip bandwidth of 16×4×30 Gbps×2 directions=3.84 Tb/s (Tera-bytes per second) of off-chip pin bandwidth that can be flexibly partitioned to support high-radix interconnection networks of TSPs for large-scale systems. The host interface for peripheral component interconnect express (PCIe) Gen4 may be also handled in this module. The host interface may provide a lightweight direct memory access (DMA) engine to emplace a model onto the TSP memory and provide an entry point for bootstrapping the model execution. The host interface may also provide a general mechanism for passing interrupts to the host, which may be necessary in the event a multi-bit memory error is observed, for example.

Table I provides a summary of example instructions for each functional slice, in accordance with some embodiments.

TABLE I

SUMMARY OF INSTRUCTIONS FOR EACH FUNCTIONAL SLICE

| | Instruction | Description |
|---|---|---|
| ICU | NOP N | No-operation, can be repeated N times to delay by N cycles |
| | Ifetch | Fetch instructions from streams or local memory |
| | Sync | Parks at the head of the instruction dispatch queue to await barrier notification |
| | Notify | Releases the pending barrier operations causing instruction flow to resume |
| | Config | Configure low-power mode |
| | Repeat n, d | Repeat the previous instruction n times, with d cycles between iterations |
| MEM | Read a, s | Load vector at address a onto stream s |
| | Write a, s | Store stream s register contents into main memory address a |
| | Gather s, map | Indirectly read addresses pointed to by map putting onto stream s |
| | Scatter s, map | Indirectly store stream s into address in the map stream |
| VXM | unary operation | z = op x pointwise operation on 1 operand, x, producing 1 result, z (e.g., mask, negate) |
| | binary operation type | z = x op y pointwise operations with 2 operands x and y producing 1 result, z (e.g., add, mul, sub) |
| | conversions | Converting fixed point to floating point, and vice versa |
| | ReLU | Rectified linear unit activation function max(0, x) |
| | TanH | Hyperbolic tangent - activation function |
| | Exp | Exponentiation $e^x$ |
| | RSqrt | Reciprocal square root |
| MXM | LW | Load weights (LW) from streams to weight buffer |
| | IW | Install weights (IW) from streams or LW buffer into the 320 × 320 array |
| | ABC | Activation buffer control (ABC) to initiate and coordinate arriving activations |
| | ACC | Accumulate (ACC) either INT32 or FP32 result from MXM |
| SXM | Shift up/down N | Lane-shift streams up/down by N lanes, and Select between North/South shifted vectors |
| | Permute map | |
| | Distribute map | Bijective permute 320 inputs $\xrightarrow{map}$ outputs Rearrange or replicate data within a superlane (16 lanes) |
| | Rotate stream | Rotate n × n input data to generate $n^2$ output streams with all possible rotations (n = 3 or n = 4) |
| | Transpose sg16 | Transpose 16 × 16 elements producing 16 output streams with rows and columns interchanged |
| C2C | Deskew | Manage skew across plesiochronous links |
| | Send | Send a 320-byte vector |
| | Receive | Receive a 320-byte vector, emplacing it in main memory |

A sequence of instructions performed on different functional slices can be chained to create more complex actions without the need to write back intermediate results to memory. This can allow efficient processing of streams at full bandwidth and lowest latency.

Machine learning algorithms typically operate on vectors with coefficients of a specified data type (e.g., INT8, FP16, etc.). These vectors may be interpreted as an abstraction over the underlying data, whose elements can be processed by the same operation in a SIMD manner. The TSP may operate on vectors that can be organized into rank-2 tensors, and may rely on the graph-lowering compiler to transform higher rank tensors into rank-2 tensors.

The TSP's programming model can represent a producer-consumer model where each functional slice acts as a consumer and a producer of one or more streams. When a vector is read from a main memory, the vector may be given a stream identifier (0, . . . , 31) and direction: eastward, or westward. Once the vector is read into a stream register, the vector becomes a stream and may "flow" in the given direction in the following sense: given spatially adjacent functional slices at coordinates $x_0$, $x_1$, $x_2$ (where the spatial coordinate increases in the direction of flow), then at a given time the vector representing stream $s_1$ at functional slice $x_1$ can be accessed as operands by that functional slice. Similarly, the functional slices at $x_0$ and $x_2$ would have access to different stream values for the same stream register. In the following cycle $t_{i+1}$ the value $s_1$ either propagates to the functional slice at $x_2$, or else the value $s_1$ is overwritten with a result $r_1$ produced by the functional slice at $x_1$ at cycle t. Similarly, the stream value so that was present to be consumed by the functional slice at coordinate $x_0$ at time $t_i$ would be (absent $x_0$ overwriting the value at time $t_i$) available in the next cycle $t_{i+1}$ to the functional slice at $x_1$. Stream operands may be steered toward the functional slice that is consuming the stream operands and producing a result stream. Streams may flow constantly across the chip, serving as how functional slices communicate with one another. FIG. 4 provides a graphical depiction of the interleaving of functional units and stream registers that combine to support this programming model.

In the TSP programming model, an instruction can be issued on a functional slice at a given compiler-scheduled time t and execute as a SIMD operation on stream-supplied operand vectors (e.g., of up to 320-elements), producing vectors of the same length on result streams. For example, at the micro-architectural level, the 320-element SIMD instruction can be pipelined across the vertical stack of computational elements in the functional slice. That is, at the scheduled time t, the instruction would be issued to the bottom-most computational element of the functional slice, e.g., corresponding to the first 16-element superlane of operand/result vectors. In the subsequent operational cycle, the instruction would be propagated to the next computational element northward in the functional slice, which in turn executes the instruction on the next 16-element super lane of operand vectors. This process can continue cycle-by-cycle until the process has traversed, e.g., all 20 computational elements in the functional slice. The combination of vertical instruction pipelining described above, along with the need for operands and instructions to coincide at a precise time, can result in a spatial "stagger" of SIMD operand and result data.

On-Chip Deterministic Memory

An on-chip deterministic memory may be implemented as a SRAM with multiple MEM slices. The on-chip deterministic memory (MEM) may supply operands for each functional slice by reading an address from a MEM slice, denoted $MEM_i$. MEM may be partitioned into two hemispheres (e.g., West MEM and East MEM, as shown for the TSP die 500 in FIG. 5), each having, e.g., 44 MEM slices numbered 0 to 43. Slice $MEM_0$ may be closest to the VXM and slice $MEM_{43}$ may be nearest to the SXM. Each MEM slice may comprise, e.g., 20 tiles, arranged in a vertical stack, yielding a 2.5 Mebibyte (Mibyte) per-slice capacity, or 220 MiBytes for all 88 slices on-chip, thus providing the memory concurrency to supply 32 operands per lane, every cycle.

The MEM slices of the on-chip deterministic memory may be partitioned into 16-byte words, each word can spread across a superlane, and each byte of each word can occupy a lane of an input channel or an output feature. That is, byte 0 can be lane0, byte 1 can be $lane_1$, etc. Each tile may produce a portion of the vector, which is concatenated with the 16 elements from the adjacent tile beneath. Instructions may execute in a cycle-by-cycle staggered manner across all 20 tiles in the slice: instructions may flow northward over the span of 20 cycles visiting each tile in the slice.

The MEM slices of the on-chip deterministic memory may provide the programming abstraction of a partitioned global shared address space with the address space laid out uniformly across the 88 slices. Each MEM slice may contain pseudo-dual-port SRAMs that can service a pair of read and write requests simultaneously when the read and write requests are not targeting the same bank of the on-chip deterministic memory. As such, the bank bit may be exposed so that the compiler can manage the underlying SRAM efficiently and appropriately. This can allow the compiler to take advantage of all 88 slices in 176-way memory concurrency—88 slices each with two banks—to read operands to or store results from streams.

To maximize stream concurrency, the compiler may allocate memory for tensor's concurrent stream operands into separate MEM slices—as streams propagate through the MEM slices, the streams "pick up" operands from the MEM slices enroute to the MXM. This fine-grain memory management may require that the various levels of memory concurrency are exposed in the ISA allowing the compiler to explicitly schedule individual banks in each MEM slice. In an embodiment, operands are simultaneously read from one bank and results are written to the other bank in the same MEM slice.

Conventional CPUs rely on a memory hierarchy to implicitly move data between caches to service load/store operations. Cache hierarchies introduce a reactive agent in the data path that causes the undesired unpredictability, or non-determinism, in the data path to provide the illusion of sequentially consistent memory transactions within the memory hierarchy. Unlike a conventional CPU, the on-chip deterministic memory provides a thin layer of memory management that can be used to identify memory concurrency on an operation-by-operation basis.

Off-Chip Deterministic Memory

Embodiments of the present disclosure are further directed to an integrated circuit or a deterministic streaming system with at least one deterministic streaming processor communicatively coupled (e.g., via a wired to wireless connection) with an off-chip deterministic memory. The at least one deterministic streaming processor can be a TSP commercially available from GROQ, INC, e.g., the TSP 300 of FIG. 3B or the TSP die 500 of FIG. 5. The off-chip deterministic memory may operate as a dynamic memory composed of one or more stacks of DRAM, and can be implemented by utilizing the High Bandwidth Memory (HBM) technology. The one or more stacks of DRAM coupled to the at least one deterministic streaming processor can be treated as a deterministic memory because a compiler of the deterministic streaming system can start the read/write process in a manner that can hide the non-deterministic aspect of the DRAM operations.

The TSP architecture can be designed around machine learning (ML) models with large parameter space requirements. Therefore, the TSP architecture can make use of dense DRAM capacity, which utilizes the HBM technology and consumes the available HBM bandwidth to read (i.e., fill) and write (i.e., spill) tensors between the on-chip deterministic memory (e.g., static memory or SRAM) and the off-chip deterministic memory (e.g., dynamic memory or HBM DRAM). Adding an additional layer to the memory hierarchy at the TSP architecture can increase dramatically a size of ML models that can be efficiently addressed. In particular, two levels of explicitly managed memory hierarchy tightly integrates the off-chip deterministic memory (e.g., HBM DRAM) to the on-chip deterministic scratchpad memory (e.g., SRAM).

As aforementioned, the on-chip deterministic scratchpad memory (e.g., SRAM) can provide for the necessary concurrency and bandwidth to feed functional slices of the TSP at a full speed. The fast on-chip deterministic memory can be used to provide the necessary operand bandwidth to feed the large functional units (i.e., MXM and VXM functional units), and sink results of the large functional units. The on-chip deterministic memory may have a storage capacity of, e.g., 256 Mebibytes (MiBytes). The on-chip deterministic memory may store data as, e.g., 16 byte words (128 bits) with 9-bits of SECDED (single-error correction and double-error detection) ECC (error correction code) to protect from soft errors. The on-chip deterministic memory may include two hemispheres (East and West) each with eight regions (i.e., timezones) that provide access to the streaming register file (SRF) hardware structure of the TSP.

An interaction between the on-chip deterministic memory and the SRF can be achieved through the "stream register" interface and the producer-consumer model it permits. For example, semantics like "load address X from memory into stream S4" or "store stream S7 into address Y" can be utilized for loading and storing data stream(s) from/to the on-chip deterministic memory. Each memory region (i.e., timezone) may be organized into, e.g., 16 independent banks that can perform a single read or write operation per clock cycle. While the memory hardware is fully pipelined, each read or write operation has a fixed-latency instruction pipeline so the on-chip deterministic memory can produce an output after, e.g., four clock cycles at which point the data is visible on the SRF (e.g., in the target stream). Independent memory banks of the on-chip deterministic memory can provide the concurrency for operands and results that require concurrent access. In other words, if there are multiple streams of input operands, those input operands are spread across multiple banks of the on-chip deterministic memory to provide the bank-level read concurrency to feed the SRF. As data flows from the on-chip deterministic memory to different functional units consuming the data operands, the data coalesces and agglomerates the set of all operands within the SRF so that all operands necessary for executing the instruction at the consuming functional unit are delivered in parallel.

The second tier of the memory hierarchy is the off-chip deterministic memory, which can be implemented as multiple stacks of HBM DRAM. The off-chip deterministic memory (e.g., HBM DRAM) can feature vastly more capacity than the on-chip deterministic memory (e.g., SRAM), but provides a lower bandwidth and is designed to provide a dense memory capacity and energy efficiency (pJ/bit). Each memory unit of the off-chip deterministic memory may be organized into a 3D "stack" of HBM DRAM that work together to provide the required storage capacity, as shown in FIG. 6A and FIG. 6B.

Figure 6A:
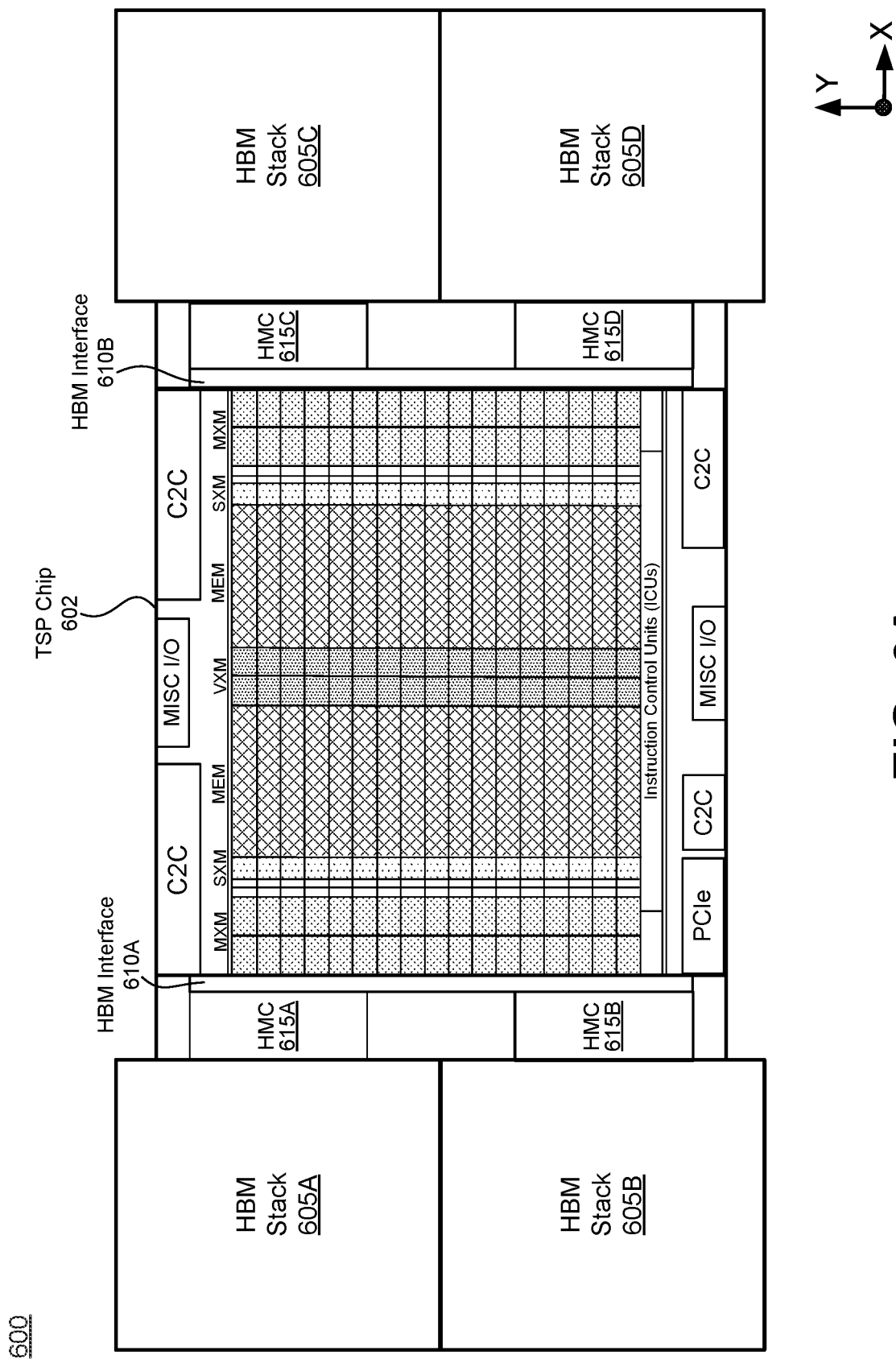
FIG. 6A illustrates an example floorplan of a TSP chip with off-chip deterministic memory stacks, in accordance with some embodiments.

FIG. 6A illustrates an example floorplan 600 of a TSP chip 602 with an off-chip deterministic memory implemented as HBM stacks, in accordance with some embodiments. The off-chip deterministic memory may include HBM stacks 605A, 605B, 605C, 605D that are coupled to the TSP chip 602 via a corresponding HBM interface 610A, 610B and a respective HBM controller (HMC) 615A, 615B, 615C, 615D. Each HBM stack 605A through 605D may include multiple HBM DRAM devices (or cards) organized as a respective three-dimensional memory stack. Each HMC 615A through 615D may control reading/writing of data streams from/to a respective HBM stack 605A through 605D. The data streams may flow (i.e., stream) via the corresponding HBM interface 610A, 610B to/from one or more superlanes of the TSP chip 602. Each HBM interface 610A, 610B may further include a respective HBM PHY. HBM stacks 605A through 605D may store different portions of a data stream. In an illustrative embodiment, a data stream comprising the 256-element vector (e.g., 256 Bytes vector) can be split within the TSP chip 602 into two halves for storage into the HBM stacks coupled to the TSP chip 602. A first half of the 256-element vector (e.g., upper 128 elements) may be stored in the "top" HBM stack 605A (or the "top" HBM stack 605C), and a second half of the 256-element vector (e.g., bottom 128 elements) may be stored in the "bottom" HBM stack 605B (or the "bottom" HBM stack 605D). More details about mapping data streams to HBM stacks as implemented in FIG. 6A are provided below in relation to FIG. 8A.

Figure 6B:
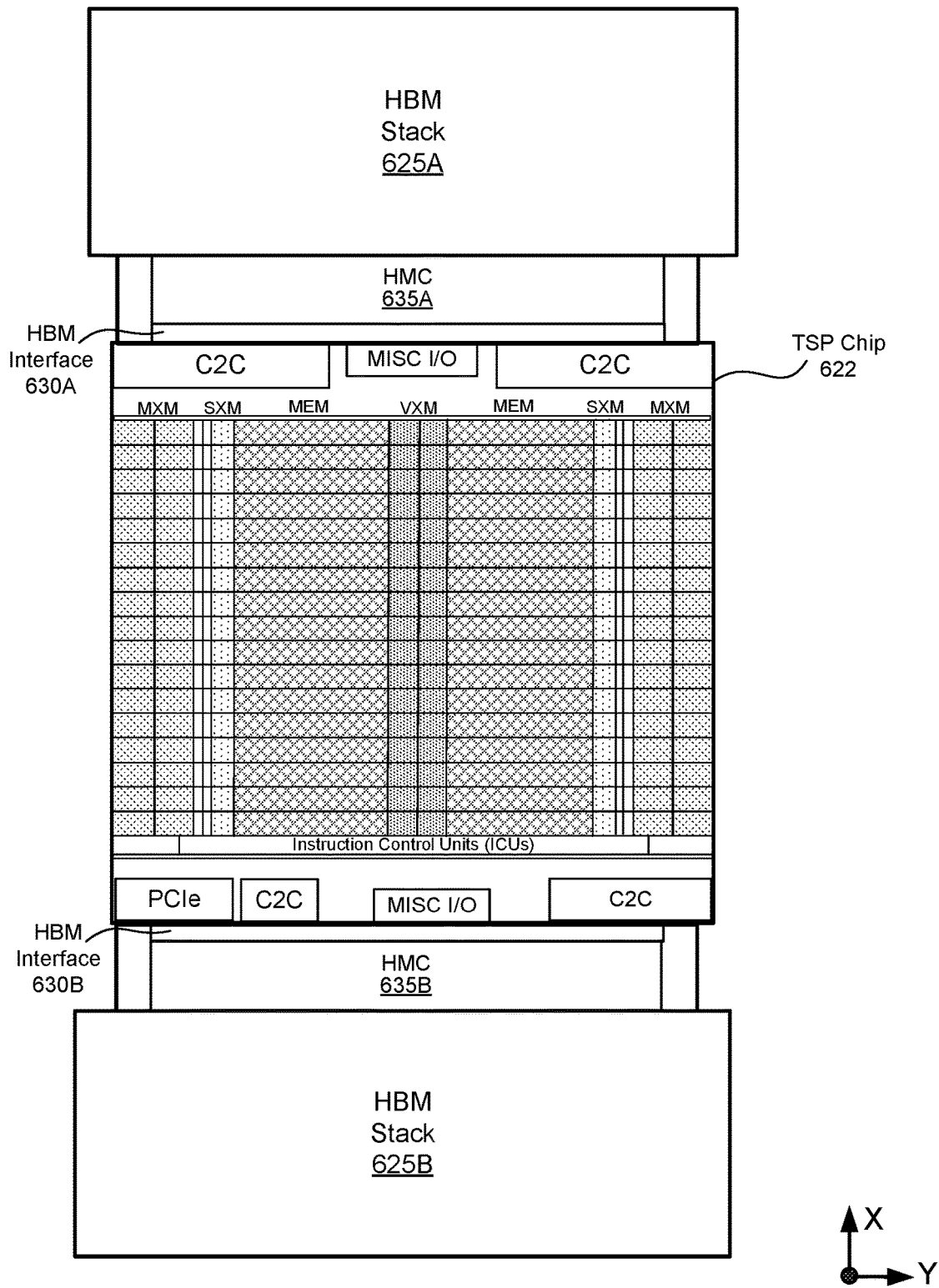
FIG. 6B illustrates another example floorplan of a TSP chip with off-chip deterministic memory stacks, in accordance with some embodiments.

FIG. 6B illustrates an example floorplan 620 of a TSP chip 622 with an off-chip deterministic memory implemented as HBM stacks, in accordance with some embodiments. The main difference between the example floorplan 620 of FIG. 6B and the example floorplan 600 of FIG. 6A is that a floorplan of the TSP chip 622 is rotated counter-clockwise by 90° relative to a floorplan of the TSP chip 602. The off-chip deterministic memory may include HBM stacks 625A and 625B that are coupled to the TSP chip 622 via a respective HBM interface 630A, 630B and a respective HMC 635A, 635B. Each HMC 635A, 635B operates in the substantially same manner as a respective HMC 615A through 615D. A capacity of the HBM stack 625A may be equal to a sum of capacities of the HBM stacks 605A and 605B in FIG. 6A. Similarly, a capacity of the HBM stack 625B may be equal to a sum of capacities of the HBM stacks 605C and 605D in FIG. 6A.

The main functional distinction between HBM stacks 605A through 605D in FIG. 6A and HBM stacks 625A-625B in FIG. 6B is that instead of dividing a data stream into multiple portions for storage into HBM stacks 605A/605B (or 605C/605D) in FIG. 6A, an entire data stream of the TSP chip 622 in FIG. 6B can be either stored in the "top" HBM stack 625A or in the "bottom" HBM stack 625B. In an illustrative embodiment, an entire data stream comprising the 256-element vectors (e.g., 256 Bytes or more) is either shifted "up" within the TSP chip 622 for storage into the "top" HBM stack 625A or shifted "down" within the TSP chip 622 for storage into the "bottom" HBM stack 625B. Storing the entire data stream (e.g., vector) in the same HBM device (e.g., in the HBM stack 625A or the HBM stack 625B in FIG. 6B) is more robust to hardware faults than storing the data stream (e.g., vectors) in two separate HBM devices (e.g., in the HBM stacks 605A, 605B in FIG. 6A). Storing different portions of the data stream in two separate HBM devices is less robust to hardware faults because if either HBM device fails (e.g., either HBM stack 605A or the HBM stack 605B), then the entire vector is corrupted. More details about mapping data streams to HBM stacks as implemented in FIG. 6B are provided below in relation to FIG. 8B.

Figure 7:
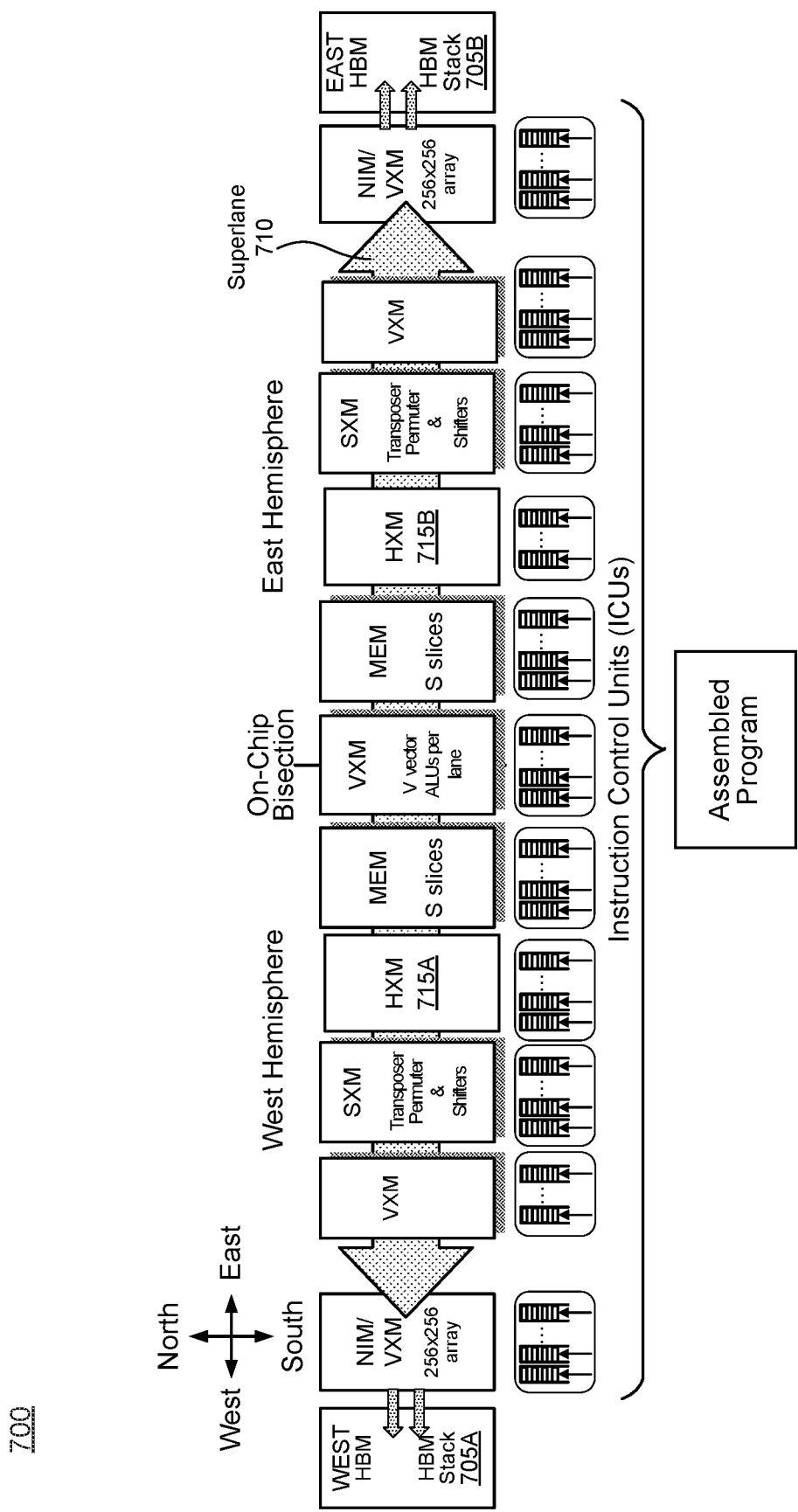
FIG. 7 illustrates an example superlane block diagram of a TSP with off-chip deterministic memory stacks, in accordance with some embodiments.

FIG. 7 illustrates an example superlane block diagram 700 of a deterministic streaming processor (e.g., TSP) coupled with an off-chip deterministic memory (e.g., HBM stacks), in accordance with some embodiments. The off-chip deterministic memory may include a West HMB stack 705A and an East HBM stack 705B coupled to a superlane 710 of the deterministic streaming processor. Coupling of the West and East HMB stacks 705A, 705B to the superlane 710 provides high storage capacity for data streams flowing through the superlane 710 in ether west direction or east direction. Coupling of the West and East HMB stacks 705A, 705B to the superlane 710 may be achieved by employing HBM execution modules (HXMs) 715A, 715B. Each HXM 715A, 715B may control streaming of, e.g., two data streams that are read from a corresponding HBM stack 705A, 705B, or two data streams to be written to the corresponding HBM stack 705A, 705B. Each HXM 715A, 715B may provide for mapping of data streams of the deterministic streaming processor to pseudo-channels (PCs) of the HBM stacks 705A, 705B. Details about mapping of data streams to PCs are provided below in relation to FIG. 8A and FIG. 8B.

A capacity of the off-chip deterministic memory (e.g., HBM DRAM stacks) may be determined by the "height" of each stack of the off-chip deterministic memory. Each stack of the off-chip deterministic memory can include 4, 8, 12 or 16 dies (e.g., DRAM dies) stacked vertically (e.g., using via contacts). Examples of possible stack configurations for each off-chip deterministic memory unit (e.g., HBM unit) can be 4-high, 8-high, 12-high, or 16-high. Additional "stacks" of the off-chip deterministic memory can appear in the address space as two additional "bank" bits that spread traffic across multiple "stacks" using the stack identifier (SID) as shown in Table II. Note that two different per-stack capacities are provided in Table II—for a first embodiment of HBM stack with 16 pseudo channels (PCs) and a second embodiment of HBM stack with 32 PCs.

TABLE II

EXAMPLE OFF-CHIP DETERMINISTIC MEMORY STACK CONFIGURATIONS

| SID (Stack ID) | Stack Height | Maximum Capacity | Total Capacity per TSP chip |
|---|---|---|---|
| 00 | 4 | 8 GB/16 GB | 16 GB/32 GB |
| 01 | 8 | 16 GB/32 GB | 32 GB/64 GB |
| 10 | 12 | 32 GB/64 GB | 64 GB/128 GB |
| 11 | 16 | 64 GB/128 GB | 128 GB/256 GB |

In some embodiments, an ASIC design of a deterministic streaming processor (e.g., TSP) supports 0, 1, or 2 stacks of an off-chip deterministic memory on each hemisphere. Each stack of the off-chip deterministic memory (e.g., HBM stack) may be capable of, e.g., a maximum throughput of 409.6 GB/s. The maximum throughput can be achieved by utilizing an HCM operating at 1.8 GHz core side, and 3.6 GHz high-bandwidth parallel interface that is 1024 bits wide (e.g., organized as 8 HBM channels, each 128 bits wide): 3.6 Gbps×1024 bits÷8 bits per byte=409.6 GB/s.

Figure 8A:
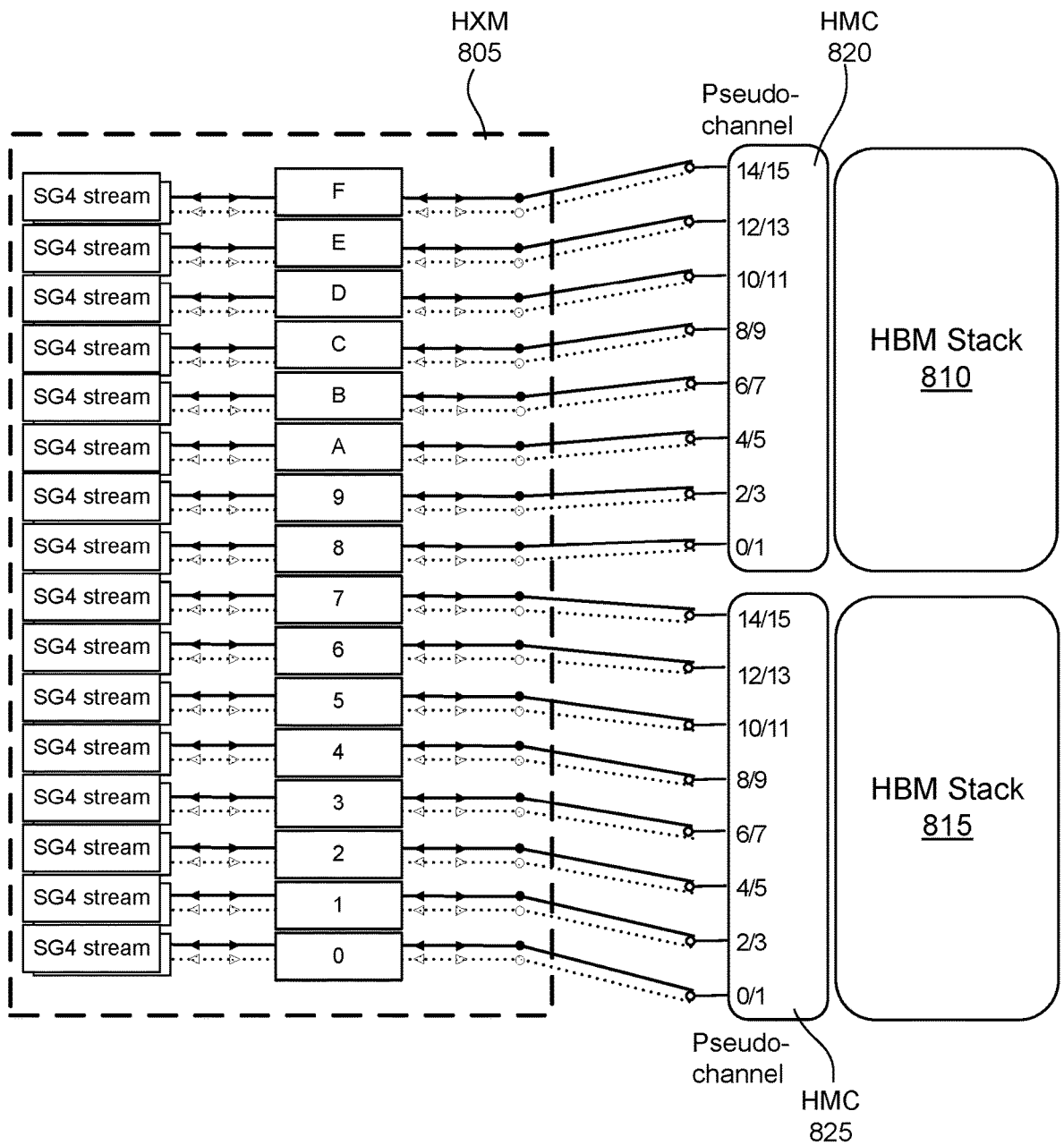
FIG. 8A illustrates an example mapping of data streams of a deterministic streaming processor (e.g., TSP) to pseudo-channels of an off-chip deterministic memory, in accordance with some embodiments.
Figure 8B:
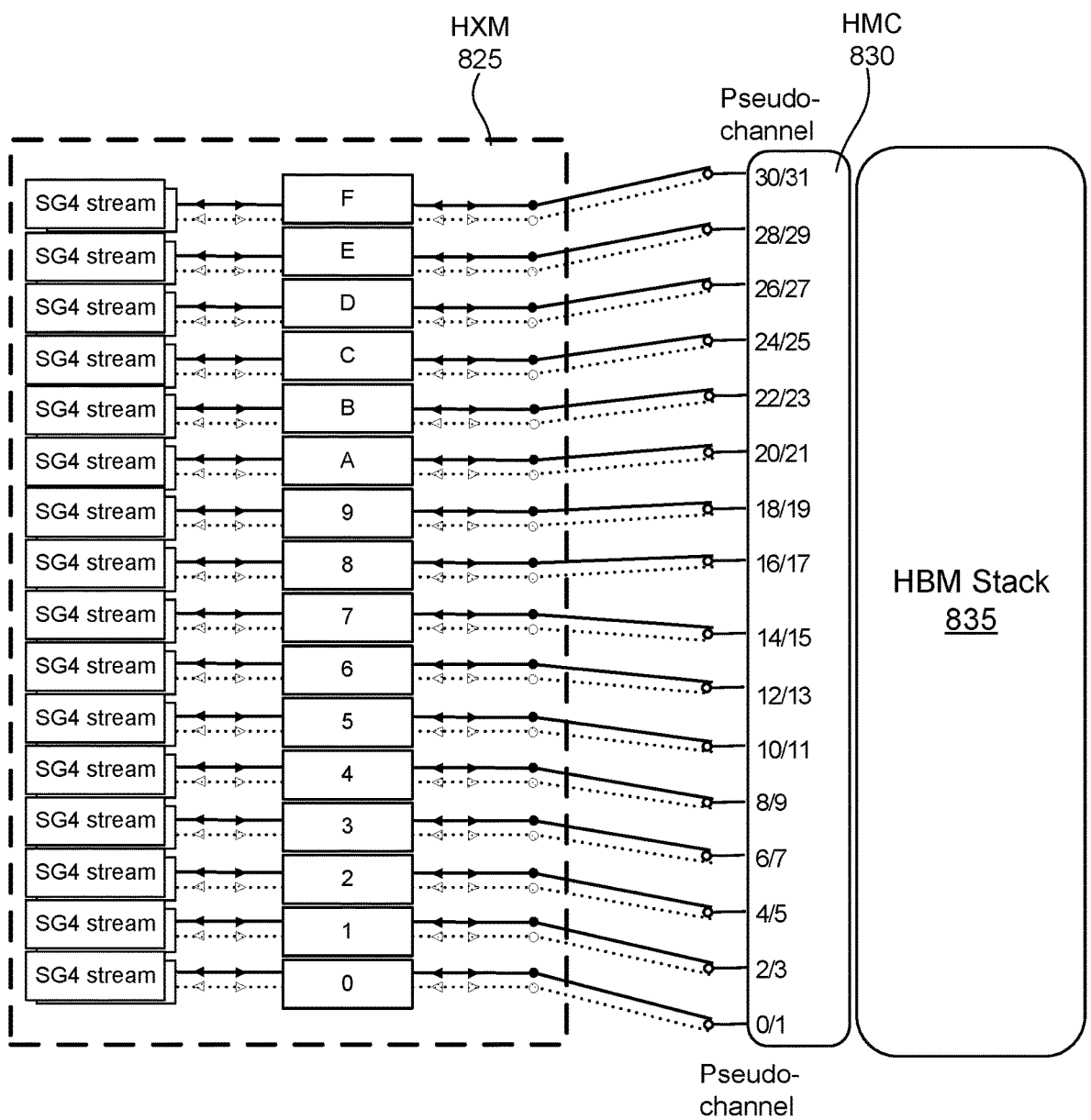
FIG. 8B illustrates another example mapping of data streams of a deterministic streaming processor (e.g., TSP) to pseudo-channels of an off-chip deterministic memory, in accordance with some embodiments.

Each stack of the off-chip deterministic memory (e.g., HBM stack) may be composed of eight independent 128 bits (16B) memory channels. In each stack of the off-chip deterministic memory, the memory channels can be further divided into two PCs per memory channel that share the ADDR/CMD bus to the off-chip deterministic memory (e.g., HBM device) for a total of, e.g., 16 PCs on each stack of the off-chip deterministic memory, as shown in FIG. 8A. Alternatively, each stack of the off-chip deterministic memory may include, e.g., 32 PCs, as shown in FIG. 8B. PCs may utilize, e.g., a 64 byte word size using a burst length (BL) of 4. A DRAM page may be organized as, e.g., 1024 bytes. Open-page policy allows the HCM to leave the DRAM page open while unit-stride references access the DRAM page. On the last reference to the DRAM page, a PRECHARGE operation may be asserted to "close" the bank/page. Since DRAM requires "refresh" operations, some variability in the Read reply latency may need to be accepted. However, if the off-chip deterministic memory (e.g., HBM device) is used in a very regular pattern (e.g., unit stride references), any per-bank refresh can be deferred so that the HCM can provide the appearance of deterministic, synchronous access.

It is desirable to exploit the available concurrency in the off-chip deterministic memory (e.g., HBM memory system) to its fullest to extract the maximum effective memory bandwidth. To that end, it is important to understand how concurrency is expressed, and how to take advantage of it. When ordering is required to ensure producer-consumer semantics between the off-chip deterministic memory and a downstream consumer of the data the off-chip deterministic memory produces, a "memory fence" (FENCE) operation can be used to notify any waiting instructions. Embodiments of the present disclosure support different dimensions of memory-level parallelism in relation to the off-chip deterministic memory. In some embodiments, the off-chip deterministic memory is implemented as a HBM DRAM organized across multiple dimensions or fields that map physical address bits to actual storage cells in an optimal manner. Details about dimensions of the off-chip deterministic memory (e.g., HBM device) concurrency are provided in Table III.

TABLE III

DIMENSIONS OF OFF-CHIP DETERMINISTIC MEMORY CONCURRENCY

| Dimension | Size | Description |
|---|---|---|
| pseudo-channel | 16 PCs or 32 PCs | Each HBM device has 8 or 16 "channels" which are bifurcated into two "pseudo channels" (PCs) each, for a total of 16 PCs or 32 PCs on each device. PCs share a common address/command bus to the HBM device. The PCs are independent and therefore represent the basic unit of concurrency for the HBM device. |
| SID | 2-bits | Stack identifier. The stack identifier describers how the memory is configured: |

TABLE III-continued

DIMENSIONS OF OFF-CHIP DETERMINISTIC MEMORY CONCURRENCY

| Dimension | Size | Description |
| --- | --- | --- |
|  |  | 00 = 4-hi stack<br>01 = 8-hi stack<br>10 = 12-hi stack<br>11 = 16-hi stack (not currently supported)<br>The SID is expressed in the physical address as the upper two bits of the bank identifier. Effectively, choosing the stack within the HBM device, then the bank within that stack. |
| bank | 4-bits | Bank number [0, 15]<br>The bank is the unit of concurrency in HBM device. Multiple banks can be opened to perform read/write operations and close the page/bank upon completion to precharge it, and commit it back to the HBM device. |
| row | 15-bits | Row address<br>The row address can be referred to as a "DRAM page" since a bank activation is performed to open a specific row address that provides a 1024 byte region (a DRAM page) which is specified by the column address. |
| column | 6-bits | Column address<br>The column address indicates the offset within the row (DRAM page). |

Functional slices of the deterministic streaming processor (e.g., TSP) may operate independently and have their own ICU that executes instructions in-order from the instruction buffers. Write requests may be dispatched to the HCM and can be considered "globally visible" immediately. That is, any subsequent Read to the same memory address would retrieve the latest value written into that memory address.

Requests to the HCM can be serviced in order, and replies are expected in the same order. In other words, the HCM should not reorder the incoming requests, or the reply data returned—incoming requests and replies are all delivered in order. The read reply data is returned in order, although in some common use cases like a CPU/GPU, caches may want to return the "critical word" of the cache line first—so the load/store unit can minimize any blocking latency.

The HCM can maintain a small amount of bookkeeping state to ensure that ordering among the requests and other functional units consuming streams sourced from the HBM data can be imposed. A read counter (Read_Count) and a write counter (Write_Count) can be associated with the HCM. The read counter may be, e.g., 10-bit counter incremented when a Read request is issued and decremented when a Read reply is received from the HBM device. The read counter may keep track of a number of concurrent read requests currently in the off-chip deterministic memory system. The write counter (Write_Count) may be, e.g., 10-bit counter incremented when a Write request is issued and decremented when the Write request reaches its serialization point in the HMC. In other words, once a Write request reaches the head of the PC arbiter, it is impossible for any subsequent Read/Write to pass it—this is its "serialization point" in the off-chip deterministic memory system. At that point, it is safe to acknowledge the Write by decrementing the write counter.

Multiple ICUs of the deterministic streaming processor may be coordinated by applying a chip-wide barrier synchronization using the SYNC instruction to park an ICU until a NOTIFY instruction is dispatched by one of the functional slices to wake up the parked ICUs and resume execution. For example, a 4-bit virtual barrier context may be used to allow up to 16 different logical barriers to be activated simultaneously. A notification instruction may include the barrier context identifier to select which of the 16 logical barriers to notify. Memory operations can be ordered with respect to other functional units by imposing ordering using the FENCE operation. The FENCE operation can be further refined by allowing a "store fence" to ensure all preceding Write operations to the off-chip deterministic memory are performed and globally visible. This is accomplished by the ICU parking on the WFENCE (write fence) instruction until the Write_Counter==0, after which point a NOTIFY instruction can be dispatched to any waiting ICUs and executing instructions out of the ICUs is resumed.

The RFENCE (read fence) instruction provides similar semantics for outstanding Read requests that are issued to the off-chip deterministic memory—waiting until Read_Count==0, and then a NOTIFY instruction is issued to awaken any SYNC'd ICUs. MEM slices of the on-chip deterministic memory (e.g., static memory or SRAM) may be waiting for the ReadReply data to be written to the on-chip deterministic memory from the off-chip deterministic memory prior to issuing MEM instructions that consume that data.

A key insight into organization of an off-chip deterministic memory is the way data streams of a deterministic streaming processor (e.g., TSP) are mapped to the off-chip deterministic memory (e.g., HBM device). FIG. 8A illustrates an example mapping of data streams of the deterministic streaming processor to pseudo-channels (PCs) of the off-chip deterministic memory, in accordance with some embodiments. An even-odd pair of PCs may be mapped to each superlane (e.g., one out of 16 superlanes 0, 1, . . . , F) of the deterministic streaming processor. Alternatively, instead of mapping each even-odd pair of PCs to a respective superlane, each even-odd pair of PCs may be mapped to a respective group of processing elements (e.g., functional slices) of the deterministic streaming processor.

FIG. 8A further shows an example coupling between an HXM 805 of the deterministic streaming processor (e.g., TSP) and a portion (i.e., one hemisphere) of the off-chip deterministic memory that includes, e.g., two HBM stacks 810, 815. The HXM 805 may be an embodiment of the HXM 715A or the HXM 715B. Each HBM stack 810, 815 may be an embodiment of the HBM stack 705A or the HBM stack 705B. Also, the HBM stack 810 may be an embodiment of the HBM stack 605A or the HBM stack 605C, and the HBM stack 815 may be an embodiment of the HBM stack 605B or the HBM stack 605D in FIG. 6A. Mapping of superlanes (or, alternatively, groups of processing elements) of the deterministic streaming processor to PCs of the off-chip deterministic memory can be achieved through corresponding HMCs 820, 825.

As instructions are executed tile-by-tile, the tiles can all perform the same instruction with different data. In effect, each HMC 820, 825 may be turned into a SIMD device. As the word granularity of superlane (or, alternatively, group of processing elements) may be, e.g., 16 bytes, and the word granularity of off-chip deterministic memory is, e.g., 64 bytes, four data streams can be coalesced into a stream group of four (i.e., SG4 input) that represents 64 bytes. An example of SG4 is the set of streams [S0, S1, S2, S3] and the set of streams [S8, S9, S10, S11], but not the set of streams [S3, S4, S5, S6], for example.

The mapping of SG4 data streams onto a 64 byte PC represents a convenient choice for representing multi-byte numeric data types such as INT32 or FP32 that each use a SG4 to represent their 32-bit values. Likewise, the compiler (or bare-metal programming language) can pack two INT16 or two FP16 values into an 5G4. However, the byte-wise elements of the SG4 data streams would be stored and retrieved in that granularity at a corresponding HBM stack 810, 815. The ordering of bytes stored in the deterministic steaming processor (e.g., TSP) can be big endian. The most-significant byte of an FP32 value can be thus stored in SG4[3] (i.e., byte 3 of the SG4 data stream, or synonymously S3), and the least-significant byte can be thus stored in SG4[0] (i.e., byte 0 of the SG4 data stream, or synonymously S0). A stream group of four (SG4) streams may be used as an input to each functional unit of the off-chip deterministic memory (e.g., each HBM bank or DRAM bank). Each functional unit of the off-chip deterministic memory may deliver two SG4 operands—one on each PC. In some embodiments, the compiler may initiate (e.g., via programming the HMC 820 and/or the HMC 825) retrieval of data streams from the HBM stack 810 and/or the HBM stack 815 at a predetermined first time instant to ensure that the retrieved data streams are timely placed on the superlanes of the deterministic steaming processor. Additionally, the compiler may initiate (e.g., via programming the HMC 820 and/or the HMC 825) writing of data streams to the HBM stack 810 and/or the HBM stack 815 at a predetermined second time instant.

As each data stream can be a SG4 of 64 bytes, it is possible to take advantage of the HBM channel efficiency and support 16 PCs at a near maximum rate for burst-length four (BL=4) requests to the corresponding HMC 820, 825. For example, the resulting vector can be produced tile-by-tile 16 bytes per clock cycle, from each of 4 streams, for a total of 16 superlanes×4 streams×2 streams per tile×16B per stream=2048 bytes per four clock cycles (for BL=4). Thus, the effective throughput can be 512 bytes—two 256 byte streams—per clock cycle on each hemisphere of the off-chip deterministic memory, i.e., for two HBM stacks 810, 815 on each hemisphere shown in FIG. 8A as part of an integrated circuit with the deterministic streaming processor (e.g., TSP integrated circuit). For example, the net throughput can be 1024 bytes per clock cycle, which is 1.84 TB/s of memory bandwidth at 1.8 GHz target core clock. This net throughput can be tuned to the maximum throughput of 1.94 TB/s ideal (not including refresh overhead) at 3.8 Gbps channel rate.

FIG. 8B illustrates another example mapping of data streams of the deterministic streaming processor to PCs of the off-chip deterministic memory, in accordance with some embodiments. An even-odd pair of PCs may be mapped to each superlane (e.g., one out of 16 superlanes 0, 1, F) of the deterministic streaming processor. Alternatively, instead of mapping each even-odd pair of PCs to a respective superlane, each even-odd pair of PCs may be mapped to a respective group of processing elements (e.g., functional slices) of the deterministic streaming processor. FIG. 8B further shows an example coupling between an HXM 825 of the deterministic streaming processor (e.g., TSP) and a portion (i.e., one hemisphere) of the off-chip deterministic memory that includes a single HBM stack 835 having 32 PCs. The HXM 825 may be an embodiment of the HXM 715A or the HXM 715B, and the HBM stack 835 may be an embodiment of the HBM stack 705A or the HBM stack 705B. Also, the HBM stack 835 may be an embodiment of the HBM stack 625A or the HBM stack 625B in FIG. 6B. Mapping of superlanes (or, alternatively, groups of processing elements) of the deterministic streaming processor to PCs of the off-chip deterministic memory (e.g., the HBM stack 835) can be achieved through an HMC 830. The HMC 830 may be an embodiment of the HMC 635A or the HMC 635B in FIG. 6B. In some embodiments, the compiler may initiate (e.g., via programming the HMC 830) retrieval of data streams from the HBM stack 835 at a predetermined first time instant to ensure that the retrieved data streams are timely placed on the superlanes of the deterministic steaming processor. Additionally, the compiler may initiate (e.g., via programming the HMC 830) writing of data streams to the HBM stack 835 at a predetermined second time instant.

An HMC can operate by utilizing two different modes of communication with the off-chip deterministic memory (e.g., HBM DRAM)—a synchronous mode and an asynchronous mode. In the synchronous mode, the HMC can service all Read requests with a fixed latency reply with, e.g., at most ±5 clock cycles of variation. In other words, all reply data would be returned with at most five clock cycles of variation. As a result, the illusion of synchronous, fixed-latency reading of unit-stride memory references can be provided. In the asynchronous mode, the HMC may incur additional delay due to a variety of reasons, including but not limiting to: (i) bank conflicts, (ii) non-aligned references that result in a read-modify-write operation in the off-chip deterministic memory (a properly aligned reference is a 64-byte aligned references within the same 1024 byte DRAM page), (iii) delay locked loop (DLL) temperature compensation and recalibration, and (iv) bank refresh. In both synchronous and asynchronous modes, data may be sourced from a variety of sources, including but not limiting to: PCIe (i.e., host's memory), an on-chip deterministic memory (e.g., SRAM), and the off-chip deterministic memory (e.g., HBM DRAM).

In the asynchronous mode, a functional unit of the off-chip deterministic memory (e.g., HBM bank) can issue a block transfer from the off-chip deterministic memory, and (optionally) sends a notification event to any downstream functional units (i.e., MEM) which are awaiting the reply data to act upon it. This completion notification can be used to signal that a larger asynchronous transaction (e.g., transferring a tensor from the off-chip deterministic memory to the on-chip deterministic memory) has been performed. A completion event can be signaled at the receipt of the first vector of a tensor (i.e., wormhole flow control), and the newly produced off-chip deterministic memory data can start being consumed. Alternatively or additionally, a completion event can be sent upon producing the last vector of a tensor, providing store-and-forward control flow between a producer (i.e., the off-chip deterministic memory) and a consumer (i.e., the on-chip deterministic memory).

The physical address mapping can define how a physical address is mapped to the underlying physical storage elements in the off-chip deterministic memory (e.g., HBM DRAM). Specifically, the physical address mapping may map a physical byte address specified on the AXI (Advanced eXtensible Interface) inputs to different dimensions of the off-chip deterministic memory (e.g., as provided in Table III), such as the physical stack ID, row address (e.g., DRAM page), column address (e.g., offset within the 1 K DRAM page), bank bits, etc.

Figure 9:
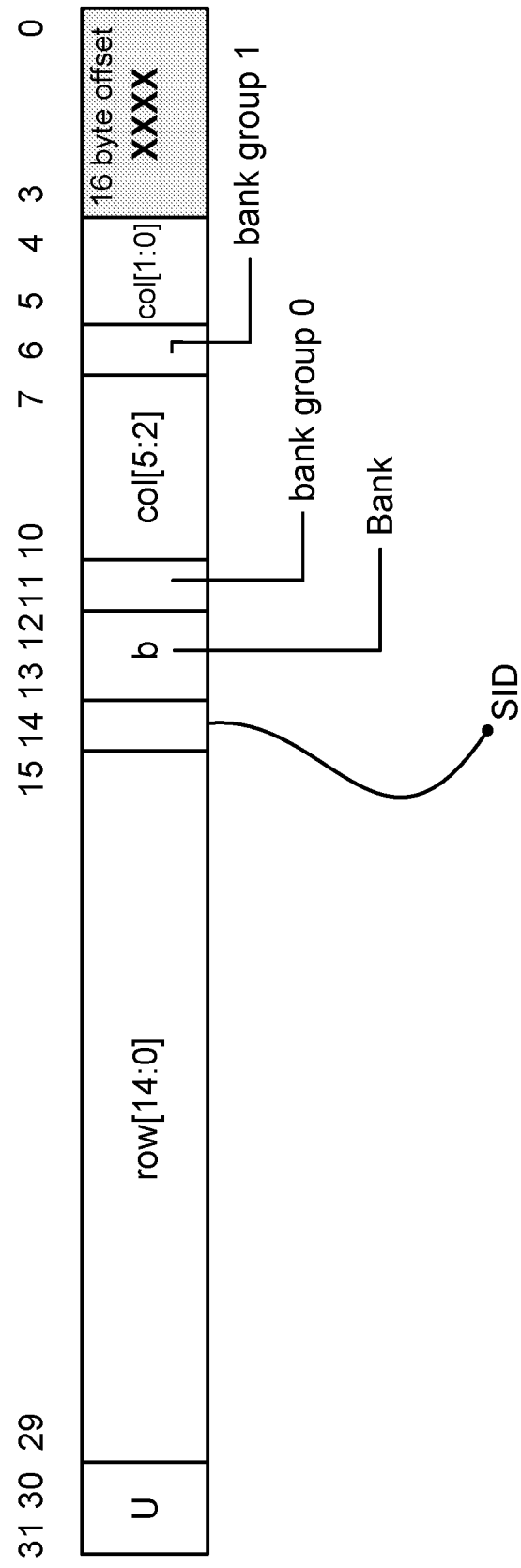
FIG. 9 illustrates an example mapping between a physical address of an off-chip deterministic memory and memory parameters, in accordance with some embodiments.

FIG. 9 illustrates an example mapping between a physical address 900 of an off-chip deterministic memory and various memory parameters, in accordance with some embodiments. The physical address 900 includes 32 bits. The bottom four bits of the physical address 900 may be implied and conveyed using the "data mask." For example, a 16-bit encoded mask may be used to indicate which bytes of the physical address 900 are valid. Bits 4:5 of the physical address 900 may be column address bits col[1:0]; bit 6 may be a bank group 1 bit; bits 7:10 may be column address bits col[5:2]; bit 11 may be a bank group 0 bit; bits 12:13 may be bank bits; bit 14 may a SID bit; bits 15:29 may be row address bits row [14:0]; and bits 30-31 may be unassigned bits. Note that mapping between bits of the physical address 900 and various memory parameters shown in FIG. 9 is only illustrative, and some different mappings between bits of the physical address 900 and memory parameters are possible.

A stride of a tensor (i.e., a reference) in the off-chip deterministic memory can be defined as the number of locations in the off-chip deterministic memory between beginnings of successive tensor elements, measured in units of the size of the tensor's elements (e.g., bytes). Tensors references at the off-chip deterministic memory may have strides of the same size as the size of each of their elements (i.e., unit-stride references), and thus each tensor may be stored and referenced at a sequence of contiguous addresses of the off-chip deterministic memory. Thus, the off-chip deterministic memory can be configured to support unit-stride references, i.e., accessing of a sequence of contiguous addresses.

In some embodiments, two levels of memory system at a deterministic streaming processor (e.g., TSP) can be explicitly managed by the compiler. The memory system of the deterministic streaming processor can support different addressing modes: (i) direct addressing where a memory address is specified in an instruction; (ii) indirect addressing—with an address specified register indirectly using a stream register to encode a memory address, and each superlane can access random addresses within the off-chip deterministic memory; and (iii) address generation for tensors (AGT) that is substantively similar to how Read/Write instructions of an off-chip deterministic memory can be iterated and encode a regular access pattern (e.g., stride).

Like an on-chip deterministic memory (e.g., SRAM), an off-chip deterministic memory (e.g., HBM DRAM) may feature a unique subset of instructions of a deterministic streaming processor (e.g., TSP) that operate on the off-chip deterministic memory. The instructions of the deterministic streaming processor configured for operation on the off-chip deterministic memory include but may not be limited to: a reading instruction, a writing instruction, and a refresh instruction. The reading instruction may be a SIMD read instruction for reading tensors from multiple banks of the off-chip deterministic memory. The writing instruction may be a SIMD write instruction for storing tensors into multiple banks of the off-chip deterministic memory. The refresh instruction may be a refresh bank instruction that forces a refresh of a corresponding bank of the off-chip deterministic memory.

Example Multiple Deterministic Streaming Processors with Deterministic Memory

Embodiments of the present disclosure are further directed to a system with multiple deterministic streaming processors (e.g., TSPs) coupled with an off-chip deterministic memory (e.g., HBM DRAM stacks). Each deterministic streaming processor may include its own on-chip deterministic memory (e.g., SRAM). In some embodiments, the basic building block of the system packaging is a chassis enclosure which houses multiple deterministic streaming processors (e.g., eight TSPs) that can be referred to as a "node."

Figure 10:
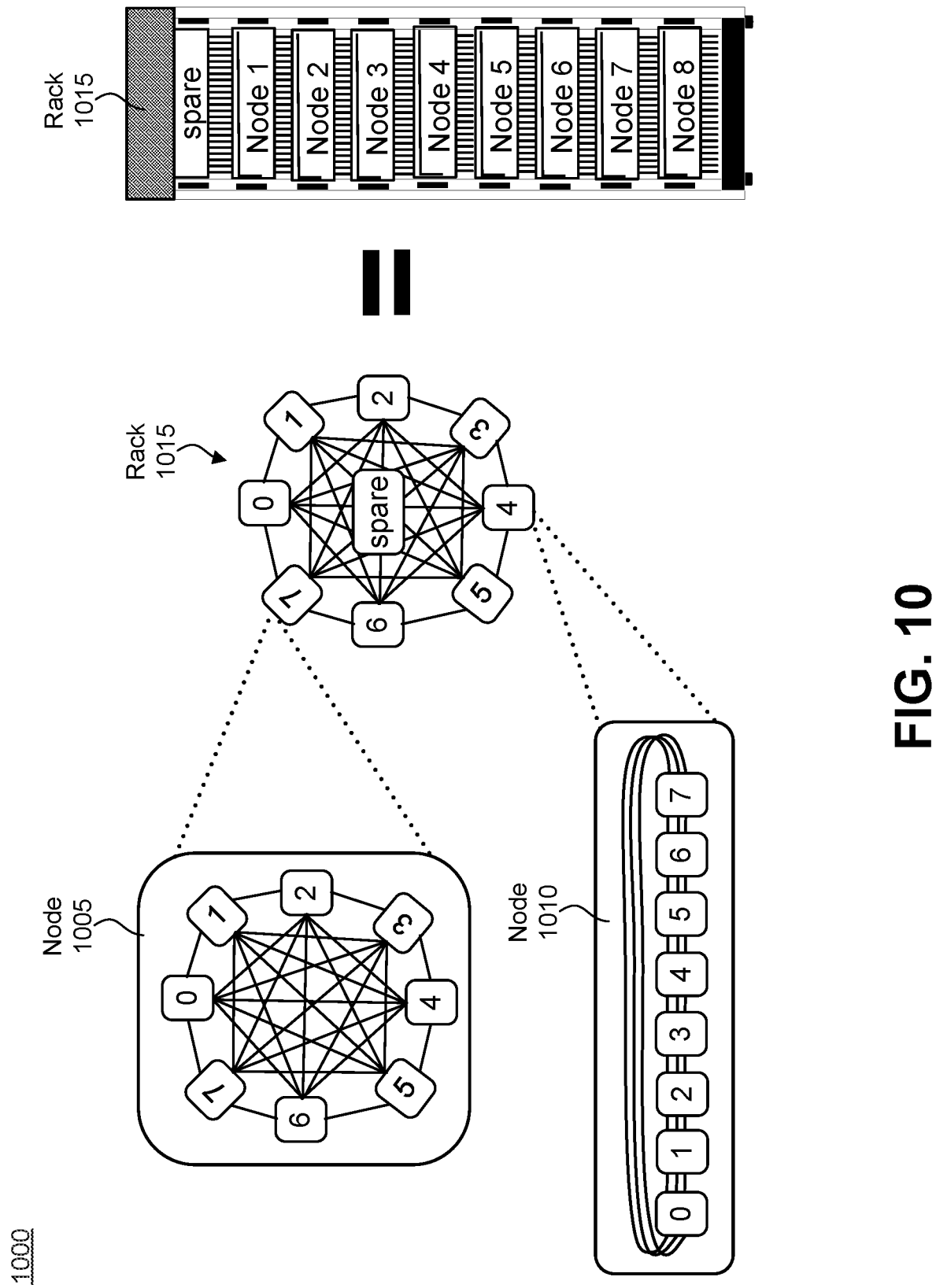
FIG. 10 illustrates an example scale-out topology block diagram of a deterministic streaming system (e.g., TSP system) with multiple deterministic streaming processors, in accordance with some embodiments.

FIG. 10 illustrates an example scale-out topology block diagram 1000 of a deterministic streaming system (e.g., TSP system) with multiple deterministic streaming processors, in accordance with some embodiments. The block diagram 1000 shows an example node 1005 that includes eight deterministic streaming processors (e.g., TSP cards or chips, labeled as 0, 1, ..., 7. The node 1005 represents an example node with all-to-all connections between the deterministic streaming processors. The node 1005 may be an embodiment of a training node. In one embodiment, each deterministic streaming processor of the node 1005 may be directly coupled to an off-chip deterministic memory (e.g., HBM stacks), such as the TSP chip 602 in FIG. 6A is coupled to the HBM stacks 605A through 605C. In another embodiment, only some of the deterministic streaming processors of the node 1005 are directly coupled to the off-chip deterministic memory (e.g., HBM stacks). In such case, data streams read from the off-chip deterministic memory may first to go through a deterministic streaming processor directly coupled to the off-chip deterministic memory (e.g., data streams read from the off-chip deterministic memory may be stored in an on-chip deterministic memory) before reaching another deterministic streaming processor that is a destination for the data streams. For both embodiments of the node 1005, the off-chip deterministic memory can be viewed by the deterministic streaming processors of the node 1005 as a global memory space, and each deterministic streaming processor of the node 1005 may be aware of any read/write operation(s) of other deterministic streaming processor(s) from/to the off-chip deterministic memory.

The block diagram 1000 further shows an example node 1010 that includes eight deterministic streaming processors (e.g., TSP cards or chips, labeled as 0, 1, ..., 7. The node 1010 represents an example node with the deterministic streaming processors configured within the node 1010 as a radix-8 torus three physical links per direction. The node 1010 may be an embodiment of an inference node. In one embodiment, each deterministic streaming processor of the node 1010 may be directly coupled to an off-chip deterministic memory (e.g., HBM stacks). In another embodiment, only some of the deterministic streaming processors of the node 1010 are directly coupled to the off-chip deterministic memory. In such case, data streams read from the off-chip deterministic memory may first to go through at least one deterministic streaming processor directly coupled to the off-chip deterministic memory before reaching a deterministic streaming processor that is a destination for the data streams. For both embodiments of the node 1010, the off-chip deterministic memory can be viewed by the deterministic streaming processors of the node 1010 as a global memory space, and each deterministic streaming processor of the node 1010 may be aware of any read/write operation(s) of other deterministic streaming processor(s) from/to the off-chip deterministic memory.

The block diagram 1000 further shows an example rack 1015 with eight nodes, each node having multiple interconnected deterministic streaming processors (e.g., TSPs). As shown in FIG. 10, at least one of the nodes in the rack 1015 (e.g., node 7) may be an embodiment of the node 1005 and configured as a training node. Some of the nodes in the rack 1015 (e.g., node 4) may be an embodiment of the node 1010 and configured as an inference node. The rack 1015 represents an example rack with all-to-all connections between the nodes. The rack 1015 may further include a spare node that is configured for communicatively interfacing multiple nodes of the rack 1015. Note that although there are all-to-all connections between the nodes within the rack 1015, there are no all-to-all connected between all deterministic streaming processors (e.g., TSPs) within the rack 1015. The deterministic streaming system shown of FIG. 10 can scale out, e.g., up to 33 nodes for total of 33×8=264 deterministic streaming processors (e.g., TSPs) by providing full connectivity between all the nodes that results in a three hop topology with minimal routing. Although not shown in FIG. 10, the deterministic streaming system can scale out to multiple interconnected racks. In one embodiment, each node of the rack 1015 may include its own off-chip deterministic memory (e.g., directly connected to one or more deterministic streaming processors of that node), which may be viewed as a global memory space for all nodes in the rack 1015. In another embodiment, some nodes of the rack 1015 may not include its own off-chip deterministic memory but can use an off-chip deterministic memory of one or more other nodes.

Figure 11A:
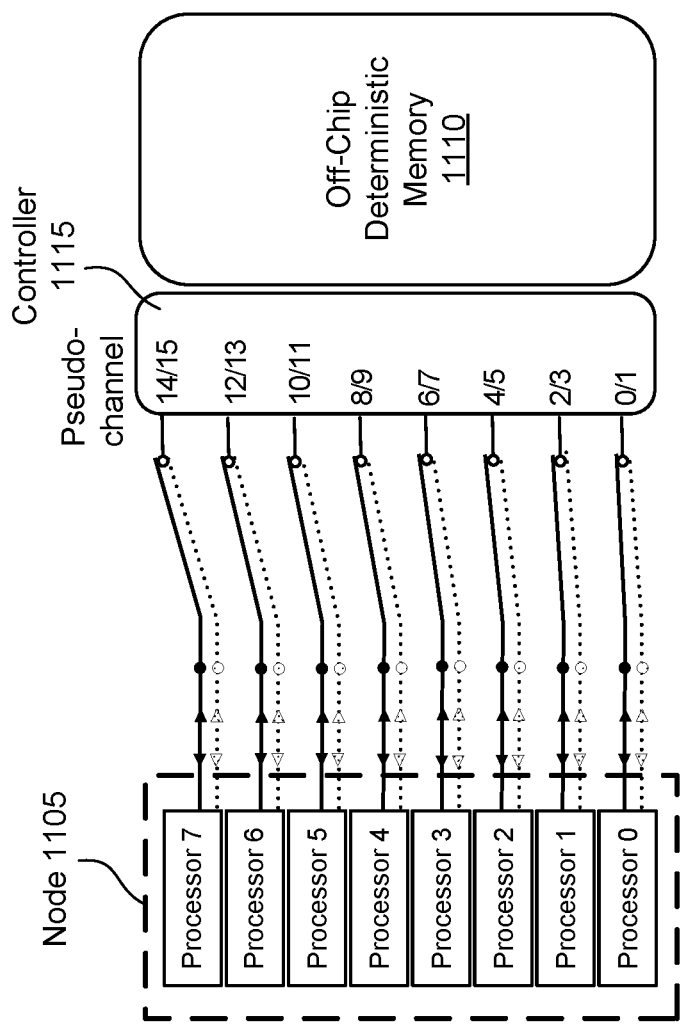
FIG. 11A illustrates an example mapping of streams of multiple deterministic streaming processors within a node to pseudo-channels of an off-chip deterministic memory, in accordance with some embodiments.

FIG. 11A illustrates an example mapping of streams of multiple deterministic streaming processors (e.g., TSPs) within a node 1105 to PCs of an off-chip deterministic memory 1110, in accordance with some embodiments. As shown in FIG. 11A, an even-odd pair of PCs are mapped to each deterministic streaming processors 0 through 7 of the node 1105. The node 1105 may be an embodiment of the node 1005 or the node 1010. The off-chip deterministic memory 1110 may be implemented as a stack of HBM DRAM devices. Mapping of the deterministic streaming processors of the node 1105 to PCs of the off-chip deterministic memory 1110 can be achieved via a controller 1115. The controller 1115 may assign a respective pair of PCs to each deterministic streaming processor of the node 1105. Each deterministic streaming processor may read/write data streams from/to the off-chip deterministic memory 1110 via the respective pair of PCs independently of other deterministic streaming processors (and simultaneously with other deterministic streaming processors) of the node 1105. The off-chip deterministic memory 1110 may represent a global addressable space sufficiently large to be shared among all deterministic streaming processors of the node 1105. Additionally, any of the deterministic streaming processors of the node 1105 may include its own off-chip deterministic memory (e.g., as illustrated in FIG. 8A and FIG. 8B). Furthermore, although not shown in FIG. 11A, deterministic streaming processors of the node 1105 can be mutually connected to exchange data streams previously accessed from the off-chip deterministic memory 1110 (or to be written to the off-chip deterministic memory 1110) via a corresponding pair of PCs assigned by the controller 1115.

Figure 11B:
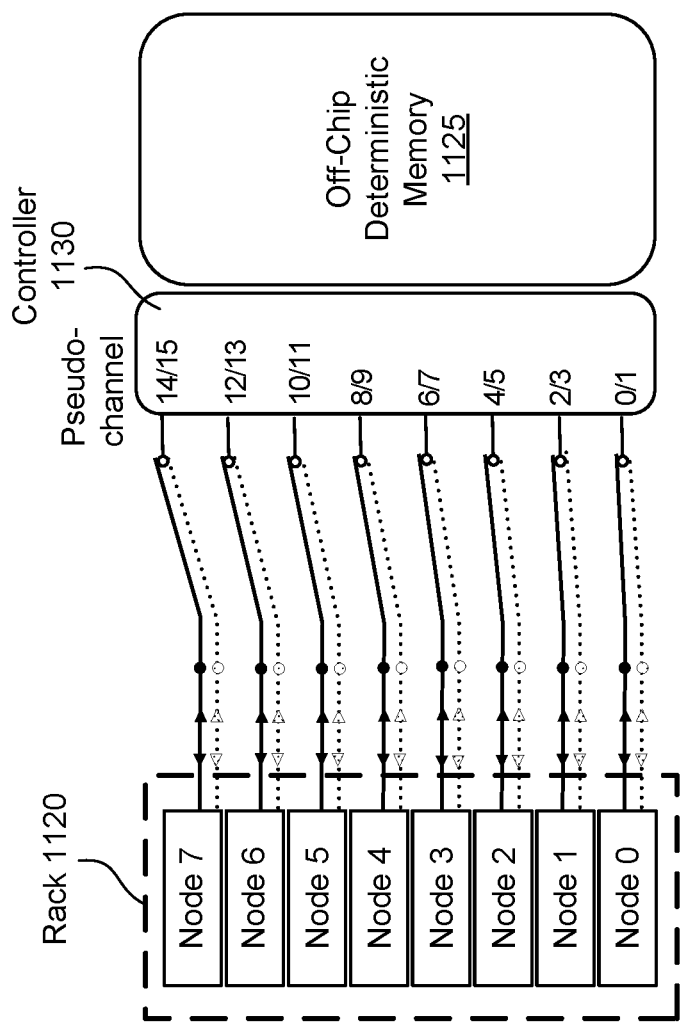
FIG. 11B illustrates an example mapping of streams of multiple nodes within a rack to pseudo-channels of an off-chip deterministic memory, in accordance with some embodiments.

FIG. 11B illustrates an example mapping of streams of multiple nodes within a rack 1120 to PCs of an off-chip deterministic memory 1125, in accordance with some embodiments. As shown in FIG. 11B, an even-odd pair of PCs are mapped to each node 0 through 7 of the rack 1120. The rack 1120 may be an embodiment of the rack 1015. The off-chip deterministic memory 1125 may be implemented as a stack of HBM DRAM devices. Mapping of the nodes of the rack 1120 to PCs of the off-chip deterministic memory 1125 can be achieved via a controller 1130. The controller 1130 may assign a respective pair of PCs to each node of the rack 1120. Each node may read/write data streams from/to the off-chip deterministic memory 1125 via the respective pair of PCs independently of other nodes (and simultaneously with other nodes) of the rack 1120. The data streams obtained at a particular node can be then dispatched to a particular deterministic streaming processor (e.g., TSP) within the node. The off-chip deterministic memory 1125 may represent a global addressable space sufficiently large to be shared among all nodes of the rack 1120. Additionally, any of the nodes of the rack 1120 may include its own off-chip deterministic memory shared by multiple deterministic streaming processors (e.g., as shown in FIG. 11A). Furthermore, although not shown in FIG. 11B, nodes of the rack 1120 can be mutually connected to exchange data streams previously accessed from the off-chip deterministic memory 1125 (or to be written to the off-chip deterministic memory 1125) via a corresponding pair of PCs assigned by the controller 1130.

Figure 11C:
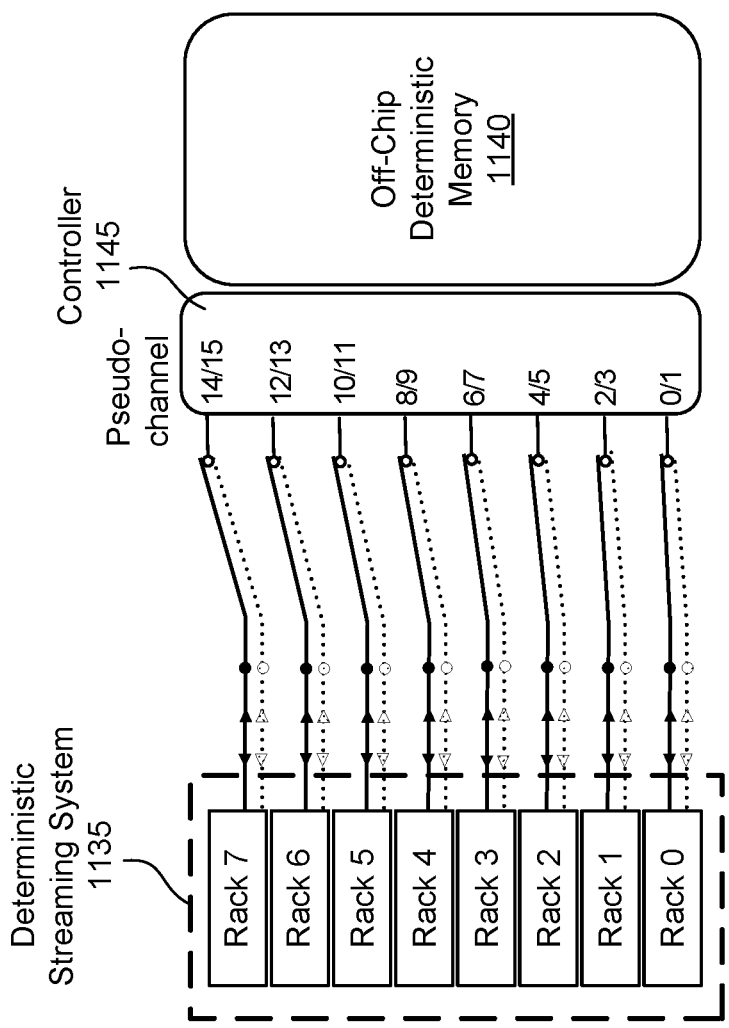
FIG. 11C illustrates an example mapping of streams of multiple racks within a deterministic streaming system to pseudo-channels of an off-chip deterministic memory, in accordance with some embodiments.

FIG. 11C illustrates an example mapping of streams of multiple racks within a deterministic streaming system 1135 to PCs of an off-chip deterministic memory 1140, in accordance with some embodiments. As shown in FIG. 11C, an even-odd pair of PCs are mapped to each rack 0 through 7 of the deterministic streaming system 1135. Each rack of the deterministic streaming system 1135 may be an embodiment of the rack 1015. The off-chip deterministic memory 1140 may be implemented as a stack of HBM DRAM devices. Mapping of the racks of the deterministic streaming system 1135 to PCs of the off-chip deterministic memory 1140 can be achieved via a controller 1145. The controller 1145 may assign a respective pair of PCs to each rack of the deterministic streaming system 1135. Each rack may read/write data streams from/to the off-chip deterministic memory 1140 via the respective pair of PCs independently of other racks (and simultaneously with other racks) of the deterministic streaming system 1135. The data streams obtained at a particular rack of the deterministic streaming system 1135 can be dispatched to a particular node within the rack and then to a particular deterministic streaming processor (e.g., TSP) within the node. The off-chip deterministic memory 1140 may represent a global addressable space sufficiently large to be shared among all racks of the deterministic streaming system 1135. Additionally, any of the racks of the deterministic streaming system 1135 may include its own off-chip deterministic memory shared by multiple nodes within the rack (e.g., as shown in FIG. 11B). Furthermore, although not shown in FIG. 11C, racks of the deterministic streaming system 1135 can be mutually connected to exchange data streams previously accessed from the off-chip deterministic memory 1140 (or to be written to the off-chip deterministic memory 1140) via a corresponding pair of PCs assigned by the controller 1145.

Example Process Flow

Figure 12:
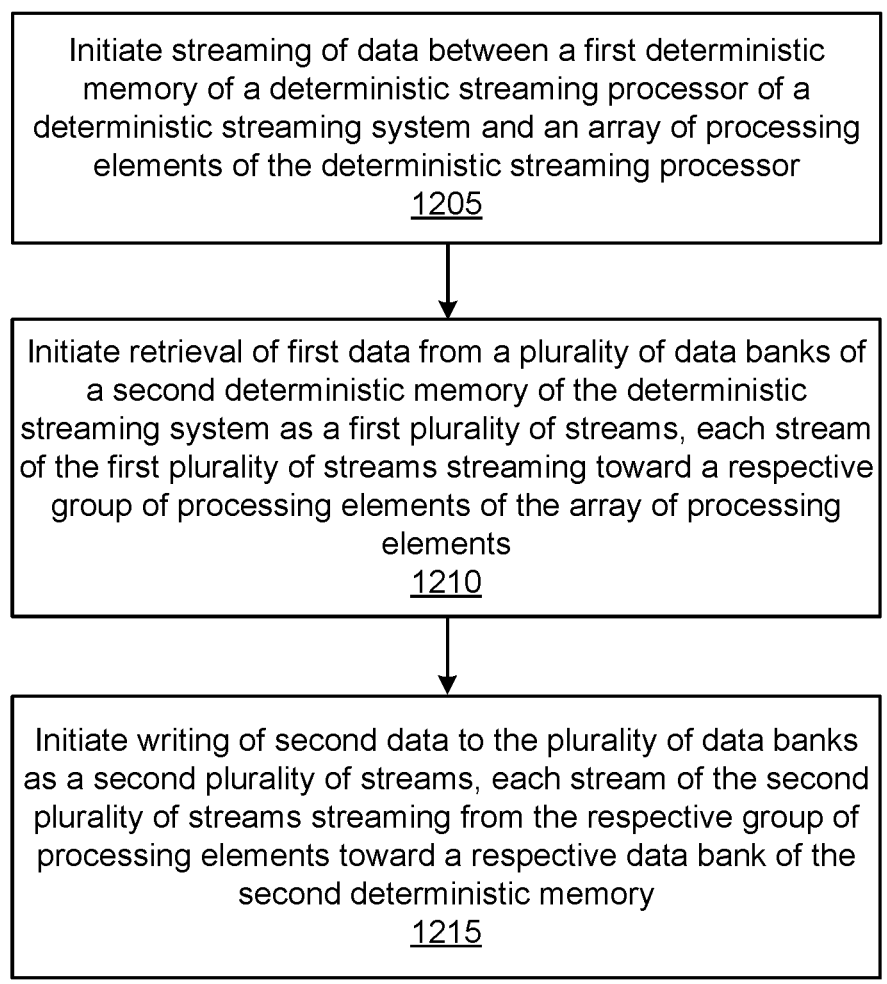
FIG. 12 is a flowchart illustrating a method of deterministic computing at a deterministic streaming system (e.g., TSP system), in accordance with some embodiments.

FIG. 12 is a flowchart illustrating a method 1200 of deterministic computing at a deterministic streaming system (e.g., TSP system), in accordance with some embodiments. The deterministic streaming system may include one or more deterministic streaming processors (e.g., one or more TSP chips or card), at least one computer processor, and a non-transitory computer-readable storage medium for storing computer executable instructions. Each deterministic streaming processor of the deterministic streaming system may be an embodiment of the TSP 300 or an embodiment of the TSP 500.

The operations of method 1200 may be initiated by a compiler operating on the at least one computer processor and/or on a host server integrated into the deterministic streaming system or separate from the deterministic streaming system. The compiler may utilize as its input a model (e.g., a machine learning model) for the one or more deterministic streaming processors and outputs instructions for configuring operation of the one or more deterministic streaming processors and the deterministic streaming system as a whole.

The deterministic streaming system initiates 1205 streaming of data between a first deterministic memory of a deterministic streaming processor of the deterministic streaming system and an array of processing elements of the deterministic streaming processor. The deterministic streaming system initiates 1210 (e.g., via a controller communicatively coupled with the second deterministic memory and/or the compiler) retrieval of first data from a plurality of data banks of a second deterministic memory of the deterministic streaming system as a first plurality of streams, each stream of the first plurality of streams streaming toward a respective group of processing elements of the array of processing elements. The deterministic streaming system initiates 1215 (e.g., via the controller and/or the compiler) writing of second data to the plurality of data banks as a second plurality of streams, each stream of the second plurality of streams streaming from the respective group of processing elements toward a respective data bank of the second deterministic memory.

The second deterministic memory may be communicatively coupled with the array of processing elements. The second deterministic memory may have a global memory address space for one or more deterministic streaming processors of the deterministic streaming system. The first deterministic memory and the second deterministic memory together form the deterministic memory of the deterministic streaming system. The first deterministic memory may comprise a static memory (e.g., SRAM), and the second deterministic memory may comprise a dynamic memory (e.g., one or more three-dimensional stacks of HBM DRAM devices). The compiler may manage initiation of the retrieval of the first data from the second deterministic memory at a predetermined first time instant to ensure that the first data from the second deterministic memory are timely placed on the first plurality of streams. Additionally, the compiler may manage initiation of the writing of the second data to the second deterministic memory at a predetermined second time instant.

The deterministic streaming system may assign each stream of the first plurality of streams and the second plurality of streams to a respective pair of pseudo channels of a plurality of pseudo channels of the second deterministic memory. The respective pair of pseudo channels may form an address channel of the second deterministic memory. Each pair of pseudo channels of the plurality of pseudo channels may be mapped to the respective group of processing elements. The second deterministic memory may be configured for simultaneous access of the plurality of data banks. The first deterministic memory may be communicatively coupled to each group of processing elements in the array of processing elements via a respective superlane of the deterministic streaming processor. Each stream of the first plurality of streams may be configured to stream toward the respective group of processing elements via a respective superlane of the deterministic streaming processor. Each stream of the second plurality of streams may be configured to stream toward the second deterministic memory via the respective superlane.

In some embodiments, the deterministic streaming system includes a plurality of deterministic streaming processors (e.g., TSP chips or cards) organized as a node of the deterministic streaming system. The deterministic streaming system may assign each of the deterministic streaming processors to a respective pair of pseudo channels of a plurality of pseudo channels of the second deterministic memory, and initiate streaming of data between each of the deterministic streaming processors and a respective data bank of the plurality of data banks of the second deterministic memory associated with the respective pair of pseudo channels.

Additionally or alternatively, the deterministic streaming system includes a plurality of nodes organized as a rack of the deterministic streaming system, each of the nodes comprising a plurality of deterministic streaming processors (e.g., TSP chips or cards). The deterministic streaming system may assign each of the nodes to a respective pair of pseudo channels of a plurality of pseudo channels of the second deterministic memory, and initiate streaming of data between each of the nodes and a respective data bank of the plurality of data banks of the second deterministic memory associated with the respective pair of pseudo channels.

Additionally or alternatively, the deterministic streaming system includes a plurality of racks, each of the racks comprises a plurality of nodes, each of the nodes comprising a plurality of deterministic streaming processors (e.g., TSP chips or cards). The deterministic streaming system may assign each of the racks to a respective pair of pseudo channels of a plurality of pseudo channels of the second deterministic memory, and initiate streaming of data between each of the racks and a respective data bank of the plurality of data banks of the second deterministic memory associated with the respective pair of pseudo channels.

Example Computer System Architecture

Figure 13A:
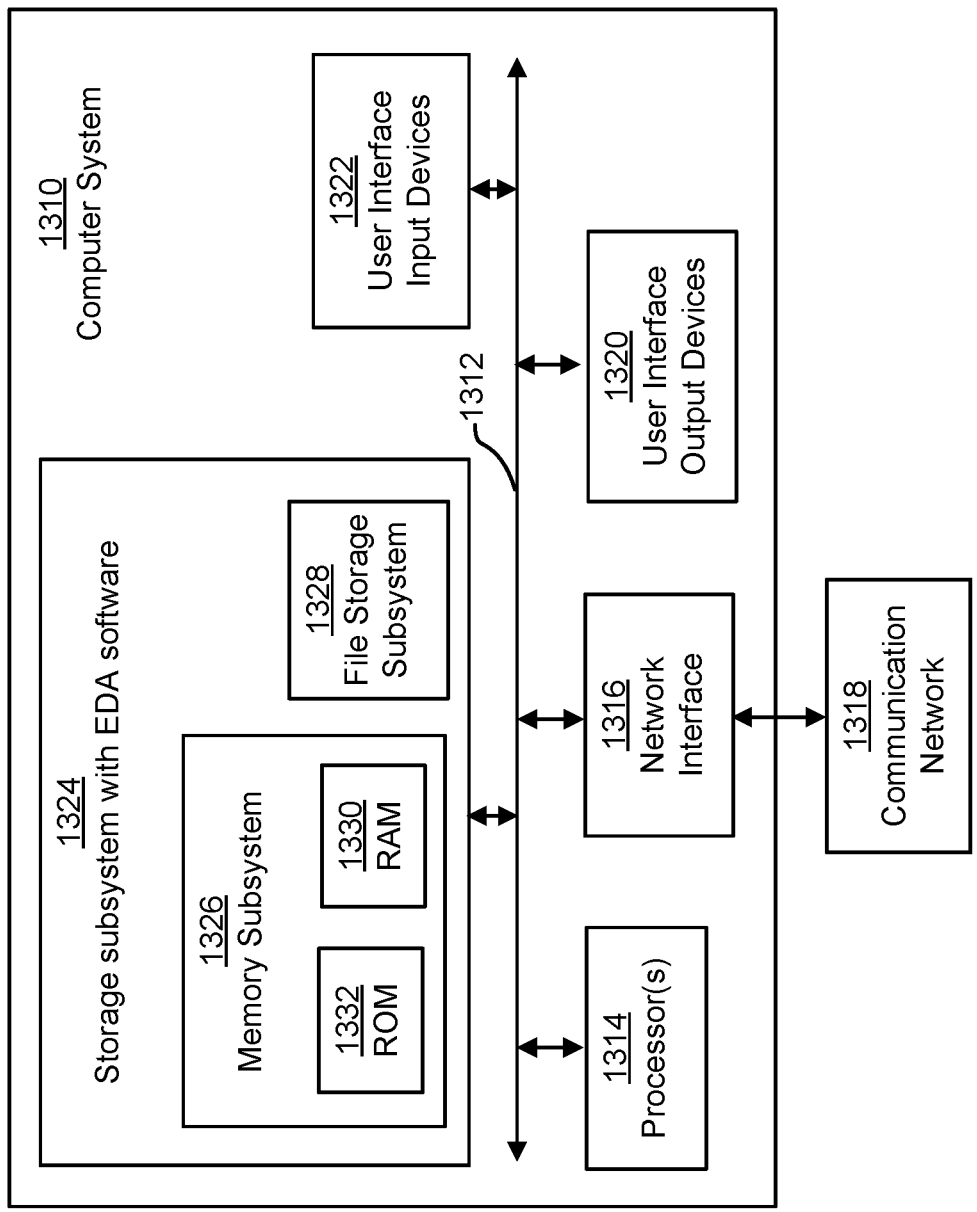
FIG. 13A is an example abstract diagram of a computer system suitable for enabling embodiments of the claimed disclosures for use in commerce, in accordance with some embodiments.

FIG. 13A is an abstract diagram of an example computer system suitable for enabling embodiments of the claimed disclosures, in accordance with some embodiments. In some embodiments described herein, a host processor may comprise the computer system of FIG. 13A.

In FIG. 13A, the structure of computer system 1310 typically includes at least one computer 1314 which communicates with peripheral devices via bus subsystem 1312. Typically, the computer includes a processor (e.g., a microprocessor, graphics processing unit, or digital signal processor), or its electronic processing equivalents, such as an ASIC or FPGA. Typically, peripheral devices include a storage subsystem 1324, comprising a memory subsystem 1326 and a file storage subsystem 1328, user interface input devices 1322, user interface output devices 1320, and/or a network interface subsystem 1316. The input and output devices enable direct and remote user interaction with computer system 1310. The computer system enables significant post-process activity using at least one output device and/or the network interface subsystem.

The computer system can be structured as a server, a client, a workstation, a mainframe, a personal computer (PC), a tablet PC, a set-top box (STB), a personal digital assistant (PDA), a cellular telephone, a smartphone, a web appliance, a rack-mounted 'blade', a kiosk, a television, a game station, a network router, switch or bridge, or any data processing machine with instructions that specify actions to be taken by that machine. The term 'server', as used herein, refers to a computer or processor that typically performs processes for, and sends data and information to, another computer or processor.

A computer system typically is structured, in part, with at least one operating system program, for example, MICROSOFT WINDOWS, APPLE MACOS and IOS, GOOGLE ANDROID, Linux and/or Unix. The computer system typically includes a Basic Input/Output System (BIOS) and processor firmware. The operating system, BIOS and firmware are used by the processor to structure and control any subsystems and interfaces connected to the processor. Example processors that enable these operating systems include: the Pentium, Itanium, and Xeon processors from INTEL; the Opteron and Athlon processors from AMD (ADVANCED MICRO DEVICES); the Graviton processor from AMAZON; the POWER processor from IBM; the SPARC processor from ORACLE; and the ARM processor from ARM Holdings.

Any embodiment of the present disclosure is limited neither to an electronic digital logic computer structured with programs nor to an electronically programmable device. For example, the claimed embodiments can use an optical computer, a quantum computer, an analog computer, or the like. Further, where only a single computer system or a single machine is signified, the use of a singular form of such terms also can signify any structure of computer systems or machines that individually or jointly use processes. Due to the ever-changing nature of computers and networks, the description of computer system 1310 depicted in FIG. 13A is intended only as an example. Many other structures of computer system 1310 have more components than the computer system depicted in FIG. 13A.

Network interface subsystem 1316 provides an interface to outside networks, including an interface to communication network 1318, and is coupled via communication network 1318 to corresponding interface devices in other computer systems or machines. Communication network 1318 can comprise many interconnected computer systems, machines and physical communication connections (signified by 'links'). These communication links can be wireline links, optical links, wireless links (e.g., using the WiFi or Bluetooth protocols), or any other physical devices for communication of information. Communication network 1318 can be any suitable computer network, for example a wide area network such as the Internet, and/or a local-to-wide area network such as Ethernet. The communication network is wired and/or wireless, and many communication networks use encryption and decryption processes, such as is available with a virtual private network. The communication network uses one or more communications interfaces, which receive data from, and transmit data to, other systems. Embodiments of communications interfaces typically include an Ethernet card, a modem (e.g., telephone, satellite, cable, or Integrated Services Digital Network (ISDN)), (asynchronous) digital subscriber line (DSL) unit, Firewire interface, universal serial bus (USB) interface, and the like. Communication algorithms ('protocols') can be specified using one or communication languages, such as Hypertext Transfer Protocol (HTTP), Transmission Control Protocol/ Internet Protocol (TCP/IP), Real-time Transport Protocol/ Real Time Streaming Protocol (RTP/RTSP), Internetwork Packet Exchange (IPX) protocol and/or User Datagram Protocol (UDP).

User interface input devices 1322 can include an alphanumeric keyboard, a keypad, pointing devices such as a mouse, trackball, toggle switch, touchpad, stylus, a graphics tablet, an optical scanner such as a bar code reader, touch-screen electronics for a display device, audio input devices such as voice recognition systems or microphones, eye-gaze recognition, brainwave pattern recognition, optical character recognition systems, and other types of input devices. Such devices are connected by wire or wirelessly to a computer system. Typically, the term 'input device' signifies all possible types of devices and processes to transfer data and information into computer system 1310 or onto communication network 1318. User interface input devices typically enable a user to select objects, icons, text and the like that appear on some types of user interface output devices, for example, a display subsystem.

User interface output devices 1320 can include a display subsystem, a printer, a fax machine, or a non-visual communication device such as audio and haptic devices. The display subsystem can include a CRT, a flat-panel device such as an LCD, an image projection device, or some other device for creating visible stimuli such as a virtual reality system. The display subsystem can also provide non-visual stimuli such as via audio output, aroma generation, or tactile/haptic output (e.g., vibrations and forces) devices. Typically, the term 'output device' signifies all possible types of devices and processes to transfer data and information out of computer system 1310 to the user or to another machine or computer system. Such devices are connected by wire or wirelessly to a computer system. Note that some devices transfer data and information both into and out of the computer, for example, haptic devices that generate vibrations and forces on the hand of a user while also incorporating sensors to measure the location and movement of the hand. Technical applications of the sciences of ergonomics and semiotics are used to improve the efficiency of user interactions with any processes and computers disclosed herein, such as any interactions with regards to the design and manufacture of circuits that use any of the above input or output devices.

Memory subsystem 1326 typically includes several memories including a main RAM 1330 (or other volatile storage device) for storage of instructions and data during program execution and a ROM 1332 in which fixed instructions are stored. File storage subsystem 1328 provides persistent storage for program and data files, and can include a hard disk drive, a floppy disk drive along with associated removable media, a CD-ROM drive, an optical drive, a flash memory such as a USB drive, or removable media cartridges. If computer system 1310 includes an input device that performs optical character recognition, then text and symbols printed on a physical object (such as paper) can be used as a device for storage of program and data files. The databases and modules used by some embodiments can be stored by file storage subsystem 1328.

Bus subsystem 1312 provides a device for transmitting data and information between the various components and subsystems of computer system 1310. Although bus subsystem 1312 is depicted as a single bus, alternative embodiments of the bus subsystem can use multiple buses. For example, a main memory using RAM can communicate directly with file storage systems using DMA systems.

FIG. 13B is another abstract diagram of a computer system suitable for enabling embodiments of the claimed disclosures, in accordance with some embodiments. In some embodiments described herein, a host processor may comprise the computer system of FIG. 13B.

FIG. 13B depicts a memory 1340 such as a non-transitory, processor readable data and information storage medium associated with file storage subsystem 1328, and/or with network interface subsystem 1316 (e.g., via bus subsystem 1312), and can include a data structure specifying a circuit design. The memory 1340 can be a hard disk, a floppy disk, a CD-ROM, an optical medium, removable media cartridge, or any other medium that stores computer readable data in a volatile or non-volatile form, such as text and symbols on a physical object (such as paper) that can be processed by an optical character recognition system. A program transferred into and out of a processor from such a memory can be transformed into a physical signal that is propagated through a medium (such as a network, connector, wire, or circuit trace as an electrical pulse); or through a medium such as space or an atmosphere as an acoustic signal, or as electromagnetic radiation with wavelengths in the electromagnetic spectrum longer than infrared light).

One skilled in the art will recognize that any of the computer systems illustrated in FIGS. 13A-13B comprises a machine for performing a process that achieves an intended result by managing work performed by controlled electron movement.

Additional Example Computing System

Figure 14:
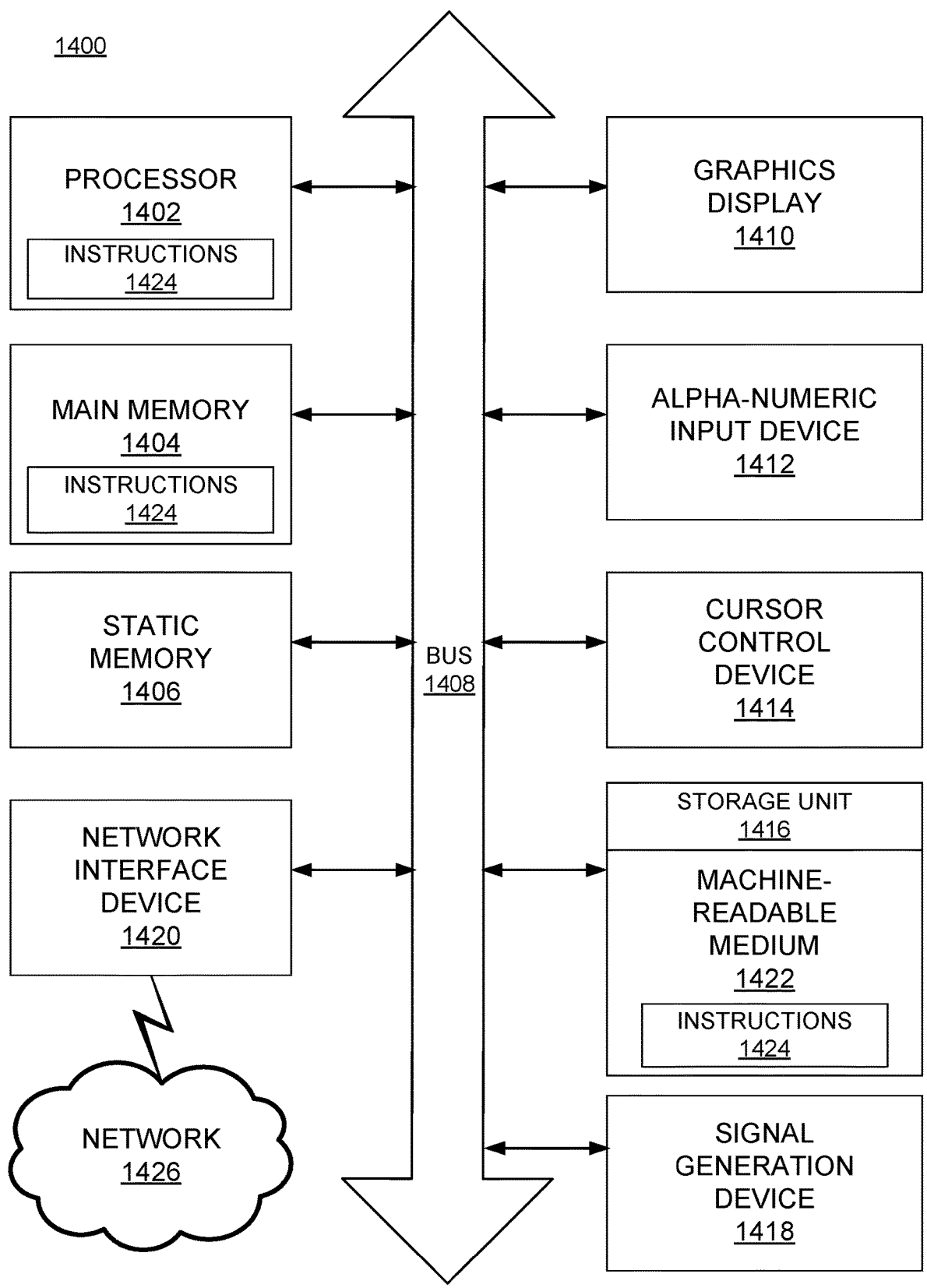
FIG. 14 illustrates a computing machine for use in commerce, in accordance with some embodiments.

FIG. 14 is a block diagram illustrating components of an example computing machine that is capable of reading instructions from a computer-readable medium and executing them in a processor (or controller) according to an embodiment. A computer described herein may include a single computing machine shown in FIG. 14, a virtual machine, a distributed computing system that includes multiple nodes of computing machines shown in FIG. 14, or any other suitable arrangement of computing devices. The computer described herein may be used by any of the elements described in the previous figures to execute the described functions.

By way of example, FIG. 14 depicts a diagrammatic representation of a computing machine in the example form of a computer system 1400 within which instructions 1424 (e.g., software, program code, or machine code), which may be stored in a computer-readable medium, causing the machine to perform any one or more of the processes discussed herein. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 14 may correspond to any software, hardware, or combined components shown in the figures above. By way of example, a computing machine may be a tensor streaming processor designed and manufactured by GROQ, INC. of Mountain View, California, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1424 that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processors (generally, a processor 1402) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1404, and a static memory 1406, which are configured to communicate with each other via a bus 1408. The computer system 1400 may further include graphics display unit 1410 (e.g., a plasma display panel (PDP), a liquid crystal display (LCD), a projector, or a cathode ray tube (CRT)). The computer system 1400 may also include alphanumeric input device 1412 (e.g., a keyboard), a cursor control device 1414 (e.g., a mouse, a trackball, a joystick, a motion sensor, or other pointing instrument), a storage unit 1416, a signal generation device 1418 (e.g., a speaker), and a network interface device 1420, which also are configured to communicate via the bus 1408.

The storage unit 1416 includes a computer-readable medium 1422 on which the instructions 1424 are stored embodying any one or more of the methodologies or functions described herein. The instructions 1424 may also reside, completely or at least partially, within the main memory 1404 or within the processor 1402 (e.g., within a processor's cache memory). Thus, during execution thereof by the computer system 1400, the main memory 1404 and the processor 1402 may also constitute computer-readable media. The instructions 1424 may be transmitted or received over a network 1426 via the network interface device 1420.

While the computer-readable medium 1422 is shown in an example embodiment to be a single medium, the term "computer-readable medium" should be taken to include a single medium or multiple media (e.g., a centralized or distributed database, or associated caches and servers) able to store instructions (e.g., the instructions 1424). The computer-readable medium 1422 may include any medium that is capable of storing instructions (e.g., the instructions 1424) for execution by the machine and that cause the machine to perform any one or more of the methodologies disclosed herein. The computer-readable medium 1422 may include, but not be limited to, data repositories in the form of solid-state memories, optical media, and magnetic media. The computer-readable medium 1422 does not include a transitory medium such as a signal or a carrier wave.

Additional Considerations

The disclosed configurations may have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing the efficiency of the transmission. In addition, by separating the transmission of data and instructions, instructions can be iterated and looped independent of received data operands.

In addition, because each computational element of the processor is dedicated to a specific function (e.g., MEM, VXM, MXM, SXM), the amount of instructions needed to be processed by the computational elements may be reduced. For example, certain computational elements (e.g., in MXM functional slice) may be configured to perform a limited set of operations on any received data. As such, these computational elements may be able to operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

In operation, a host computer programs a DMA engine to actually transfer data, again all of which is coordinated by the runtime layer. Specifically, the IDU transfers 320-byte vectors from PCIe-Gen4 32-bytes every core-clock cycle (e.g., nominal 900 Mhz). Thus, the 320-element vector arrives over a period of 10 cycles and placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified functional slice of the MEM.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments of the present disclosure may further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A deterministic streaming system comprising:
   one or more deterministic streaming processors, each deterministic streaming processor including:
      an array of processing elements, and
      a first deterministic memory communicatively coupled to the array of processing elements;
   a second deterministic memory communicatively coupled with the array of processing elements, the second deterministic memory comprising a plurality of data banks having a global memory address space for the one or more deterministic streaming processors, wherein the first deterministic memory comprises a static memory and the second deterministic memory comprises a dynamic memory; and
   a controller communicatively coupled with the second deterministic memory and configured to:
      initiate retrieval of first data from the plurality of data banks of the second deterministic memory as a first plurality of streams, each stream of the first plurality of streams streaming toward a respective group of processing elements of the array of processing elements, and
      initiate writing of second data to the plurality of data banks of the second deterministic memory as a second plurality of streams, each stream of the second plurality of streams streaming from the respective group of processing elements toward a respective data bank of the second deterministic memory.

2. The deterministic streaming system of claim 1, wherein the controller is further configured to assign each stream of the first plurality of streams and the second plurality of streams to a respective pair of pseudo channels of a plurality of pseudo channels of the second deterministic memory.

3. The deterministic streaming system of claim 2, wherein the respective pair of pseudo channels form an address channel of the second deterministic memory.

4. The deterministic streaming system of claim 2, wherein each pair of pseudo channels of the plurality of pseudo channels is mapped to the respective group of processing elements.

5. The deterministic streaming system of claim 1, wherein the second deterministic memory is configured for simultaneous access of the plurality of data banks.

6. The deterministic streaming system of claim 1, wherein the first deterministic memory is communicatively coupled to each group of processing elements in the array of processing elements via a respective superlane of the deterministic streaming processor.

7. The deterministic streaming system of claim 1, wherein:
  each stream of the first plurality of streams is configured to stream toward the respective group of processing elements via a respective superlane of the deterministic streaming processor; and
  each stream of the second plurality of streams is configured to stream toward the second deterministic memory via the respective superlane.

8. The deterministic streaming system of claim 1, wherein the dynamic memory comprises one or more three-dimensional stacks of a high bandwidth memory devices.

9. The deterministic streaming system of claim 1, wherein the static memory is a static random access memory, and the dynamic memory comprises one or more three-dimensional stacks of a dynamic random access memory devices.

10. The deterministic streaming system of claim 1, wherein:
  the one or more deterministic streaming processors comprise a plurality of deterministic streaming processors organized as a node of the deterministic streaming system; and
  the controller is further configured to:
    assign each of the deterministic streaming processors to a respective pair of pseudo channels of a plurality of pseudo channels of the second deterministic memory, and
    initiate streaming of data between each of the deterministic streaming processors and a respective data bank of the plurality of data banks of the second deterministic memory associated with the respective pair of pseudo channels.

11. The deterministic streaming system of claim 1, wherein:
  the deterministic streaming system further comprises a plurality of nodes organized as a rack of the deterministic streaming system, each of the nodes comprising a plurality of deterministic streaming processors; and
  the controller is further configured to:
    assign each of the nodes to a respective pair of pseudo channels of a plurality of pseudo channels of the second deterministic memory, and
    initiate streaming of data between each of the nodes and a respective data bank of the plurality of data banks of the second deterministic memory associated with the respective pair of pseudo channels.

12. The deterministic streaming system of claim 1, wherein:
  the deterministic streaming system further comprises a plurality of racks, each of the racks comprises a plurality of nodes, each of the nodes comprising a plurality of deterministic streaming processors; and
  the controller is further configured to:
    assign each of the racks to a respective pair of pseudo channels of a plurality of pseudo channels of the second deterministic memory, and
    initiate streaming of data between each of the racks and a respective data bank of the plurality of data banks of the second deterministic memory associated with the respective pair of pseudo channels.

13. The deterministic streaming system of claim 1, further comprising a compiler configured to:
  manage initiation of the retrieval of the first data at a predetermined first time instant; and
  manage initiation of the writing of the second data at a predetermined second time instant.

14. A method of deterministic computing at a deterministic streaming system, the method comprising:
  initiating streaming of data between a first deterministic memory of a deterministic streaming processor of the deterministic streaming system and an array of processing elements of the deterministic streaming processor;
  initiating retrieval of first data from a plurality of data banks of a second deterministic memory of the deterministic streaming system as a first plurality of streams, each stream of the first plurality of streams streaming toward a respective group of processing elements of the array of processing elements, the second deterministic memory having a global memory address space for one or more deterministic streaming processors of the deterministic streaming system; and
  initiating writing of second data to the plurality of data banks as a second plurality of streams, each stream of the second plurality of streams streaming from the respective group of processing elements toward a respective data bank of the second deterministic memory,
  wherein the one or more deterministic streaming processors comprise a plurality of deterministic streaming processors organized as a node of the deterministic streaming system, and the method further comprising:
  assigning each of the deterministic streaming processors to a respective pair of pseudo channels of a plurality of pseudo channels of the second deterministic memory; and
  initiating streaming of data between each of the deterministic streaming processors and a respective data bank of the plurality of data banks of the second deterministic memory associated with the respective pair of pseudo channels.

15. The method of claim 14, further comprising:
  assigning each stream of the first plurality of streams and the second plurality of streams to a respective pair of pseudo channels of the plurality of pseudo channels of the second deterministic memory; and
  mapping each pair of pseudo channels of the plurality of pseudo channels to the respective group of processing elements.

16. The method of claim 14, further comprising:
  initiating streaming of each stream of the first plurality of streams toward the respective group of processing elements via a respective superlane of the deterministic streaming processor; and
  initiating streaming of each stream of the second plurality of streams toward the second deterministic memory via the respective superlane.

17. The method of claim 14, wherein a plurality of nodes, including the node, are organized as a rack of the deterministic streaming system.

18. A non-transitory computer-readable storage medium having stored thereon executable instructions, which when executed by a computer processor cause the computer processor to:
  initiate streaming of data between a first deterministic memory of a deterministic streaming processor of a deterministic streaming system and an array of processing elements of the deterministic streaming processor;
  initiate retrieval of first data from a plurality of data banks of a second deterministic memory of the deterministic streaming system as a first plurality of streams, each stream of the first plurality of streams streaming toward a respective group of processing elements of the array of processing elements, the second deterministic memory having a global memory address space for one or more deterministic streaming processors of the deterministic streaming system; and initiate writing of second data to the plurality of data banks as a second plurality of streams, each stream of the second plurality of streams streaming from the respective group of processing elements toward a respective data bank of the second deterministic memory, wherein the one or more deterministic streaming processors comprise a plurality of deterministic streaming processors organized as a node of the deterministic streaming system, and the method further comprising:

assigning each of the deterministic streaming processors to a respective pair of pseudo channels of a plurality of pseudo channels of the second deterministic memory; and initiating streaming of data between each of the deterministic streaming processors and a respective data bank of the plurality of data banks of the second deterministic memory associated with the respective pair of pseudo channels.

19. The non-transitory computer-readable storage medium of claim 18, wherein a plurality of nodes, including the node, are organized as a rack of the deterministic streaming system.

20. The non-transitory computer-readable storage medium of claim 18, wherein the instructions, when expected by the computer processor further cause the computer processor to: further comprising:

initiate streaming of each stream of the first plurality of streams toward the respective group of processing elements via a respective superlane of the deterministic streaming processor;

and initiate streaming of each stream of the second plurality of streams toward the second deterministic memory via the respective superlane.

* * * * *